United States Patent
Pandey et al.

(10) Patent No.: US 10,984,815 B1
(45) Date of Patent: Apr. 20, 2021

(54) TECHNIQUES FOR REMOVING NON-LINEAR ECHO IN ACOUSTIC ECHO CANCELLERS

(71) Applicant: Cypress Semiconductor Corporation, San Jose, CA (US)

(72) Inventors: Ashutosh Pandey, Irvine, CA (US); Ted Wada, Irvine, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 66 days.

(21) Appl. No.: 16/585,750

(22) Filed: Sep. 27, 2019

(51) Int. Cl.
| | |
|---|---|
| *G10L 21/0232* | (2013.01) |
| *H04R 3/00* | (2006.01) |
| *H04R 5/027* | (2006.01) |
| *H04R 1/40* | (2006.01) |
| *H04L 5/00* | (2006.01) |
| G10L 21/0208 | (2013.01) |

(52) U.S. Cl.
CPC ........ *G10L 21/0232* (2013.01); *H04L 5/0048* (2013.01); *H04R 1/406* (2013.01); *H04R 3/005* (2013.01); *H04R 5/027* (2013.01); G10L 2021/02082 (2013.01)

(58) Field of Classification Search
CPC ....... G10L 21/0232; G10L 2021/02082; G10L 21/02; H04L 5/0048; H04R 1/406; H04R 3/005; H04R 5/027; H04M 9/082; G10K 2210/505
See application file for complete search history.

(56) References Cited

U.S. PATENT DOCUMENTS

| | | | | |
|---|---|---|---|---|
| 8,175,871 | B2* | 5/2012 | Wang | H04M 9/082 704/227 |
| 9,516,409 | B1* | 12/2016 | Ramprashad | H04R 1/406 |
| 9,659,576 | B1* | 5/2017 | Kotvis | G10L 21/0224 |
| 2008/0015845 | A1* | 1/2008 | Schmidt | G10L 21/02 704/200 |
| 2008/0031469 | A1* | 2/2008 | Haulick | H04M 9/082 381/73.1 |

(Continued)

OTHER PUBLICATIONS

Costa, J.-P., Lagrange, A., and Arliaud, A., "Acoustic Echo Cancellation Using Nonlinear Cascade Filters," in Proc. IEEE ICASSP, (Hong Kong, China), pp. 389-392, Apr. 2003.

(Continued)

*Primary Examiner* — David L Ton

(57) ABSTRACT

Techniques for non-linear acoustic echo cancellation are described herein. In an embodiment, a system comprises a loudspeaker, a microphone array, a spatial filtering logic with a spatial filter, an acoustic echo canceller (AEC) logic and an adder logic block. The spatial filtering logic is configured to generate a spatially-filtered signal by applying the spatial filter using a reference signal sent to the loudspeaker and a multi-channel microphone signal from the microphone array. The generated spatially-filtered signal carries both linear echo and non-linear echo that are included in the multi-channel microphone signal. The AEC logic is configured to apply a linear adaptive filter using the spatially-filtered signal to generate a cancellation signal that estimates both the linear echo and the non-linear echo of the multi-channel microphone signal. The adder logic block is configured to generate an output signal based on the cancellation signal.

20 Claims, 9 Drawing Sheets

(56) References Cited

U.S. PATENT DOCUMENTS

| | | |
|---|---|---|
| 2008/0040333 A1 | 2/2008 | Madan et al. |
| 2008/0101622 A1* | 5/2008 | Sugiyama ............... H04R 3/002 |
| | | 381/66 |
| 2008/0162123 A1* | 7/2008 | Goldin ................ G10L 19/0204 |
| | | 704/205 |
| 2009/0041263 A1* | 2/2009 | Hoshuyama ............. H04B 3/32 |
| | | 381/94.1 |
| 2010/0208908 A1* | 8/2010 | Hoshuyama .......... H04M 9/082 |
| | | 381/66 |
| 2012/0237047 A1* | 9/2012 | Neal ...................... H04B 3/234 |
| | | 381/66 |
| 2012/0250882 A1* | 10/2012 | Mohammad ........ G10L 21/0208 |
| | | 381/94.1 |
| 2012/0330652 A1* | 12/2012 | Turnbull ................. G10L 21/02 |
| | | 704/226 |
| 2014/0003611 A1* | 1/2014 | Mohammad ............. H04B 3/20 |
| | | 381/66 |
| 2014/0126745 A1* | 5/2014 | Dickins .................... H04R 3/02 |
| | | 381/94.3 |
| 2014/0307882 A1* | 10/2014 | LeBlanc ................. H04S 7/305 |
| | | 381/66 |
| 2014/0328490 A1* | 11/2014 | Mohammad ........... H04R 3/002 |
| | | 381/66 |
| 2014/0335917 A1* | 11/2014 | Tetelbaum ............ H04M 9/082 |
| | | 455/570 |
| 2015/0112672 A1* | 4/2015 | Giacobello ......... G10L 21/0208 |
| | | 704/233 |
| 2016/0086618 A1* | 3/2016 | Neoran ............... G10L 21/0264 |
| | | 704/205 |
| 2017/0134849 A1 | 5/2017 | Pandey et al. |
| 2018/0130482 A1 | 5/2018 | Michel et al. |
| 2019/0104360 A1* | 4/2019 | Bou Daher ............ H04R 3/005 |
| 2019/0287546 A1* | 9/2019 | Ganeshkumar ..... G10L 21/0208 |
| 2019/0394338 A1* | 12/2019 | Wada .................... H04M 9/082 |
| 2020/0136675 A1* | 4/2020 | Christoph ................ H04B 3/23 |

OTHER PUBLICATIONS

Greblicki, W., "Nonlinearity Estimation in Hammerstein Systems Based on Ordered Observations," IEEE Trans. on Signal Processing, vol. 44, pp. 1224-1233, May 1996.

Guérin, A., Faucon, G., and Bouquin-Jeannès, R. L., "Nonlinear Acoustic Echo Cancellation Based on Volterra Filters," IEEE Trans. on Speech and Audio Processing, vol. 11, pp. 672-683, Nov. 2003.

Jiang, G. Y. and Hsieh, S. F., "Nonlinear Acoustic Echo Cancellation Using Orthogonal Polynomial," Proc. IEEE ICASSP, (Toulouse, France), pp. 273-276, May 2006.

Sentoni, G. and Altenberg, A., "Nonlinear Acoustic Echo Canceller with DABNet + FIR Structure," Proc. IEEE Workshop on Applications of Signal Processing to Audi and Acoustics, (Net Paltz, NY), pp. 37-40, Oct. 2005.

International Search Report for International Application No. PCT/US2020/049709 dated Dec. 30, 2020; 2 pages.

Ted S. Wada, "System Approach to Robust Acoustic Echo Cancellation Through Semi-Blind Source Separation Based on Independent Component Analysis," A Thesis Presented to The Academic Faculty, Georgia Institute of Technology, Aug. 2012; 175 pages.

Written Opinion of the International Searching Authority for International Application No. PCT/US2020/049709 dated Dec. 30, 2020; 9 pages.

\* cited by examiner

TECHNIQUES FOR REMOVING NON-LINEAR ECHO IN ACOUSTIC ECHO CANCELLERS

TECHNICAL FIELD

This disclosure relates to signal processing in audio processing systems.

BACKGROUND

Use of powerful loudspeakers is growing rapidly in audio processing systems such as smartspeakers, hands-free phone sets, and speech recognition systems. In such audio processing systems, acoustic coupling typically occurs between the loudspeaker and the microphone during playback and/or voice interactions. For example, an audio signal played by a loudspeaker is captured by the microphone in the system. The audio signal typically produces an acoustic echo when it propagates in confined space (e.g., inside a room, a vehicle, etc.), but such acoustic echo is unwanted because it may dominate a target speech signal.

To cancel the unwanted acoustic echo, audio processing systems typically use an Acoustic Echo Canceller (AEC) with linear filters to estimate the Room Impulse Response (RIR) transfer function that characterizes the propagation of acoustic signals in confined space. However, the estimation models used by the linear filters in such AECs are not suitable to model any non-linearities in the captured acoustic signal because such non-linearities have non-homogeneous origins, may change over time, and are computationally very expensive and difficult to estimate. Failing to properly cancel such non-linearities results in a residual non-linear echo in the target speech signal, which can seriously limit the performance of any systems (e.g., such as speech recognition systems) that process the target signal.

DETAILED DESCRIPTION

Figure 1A:
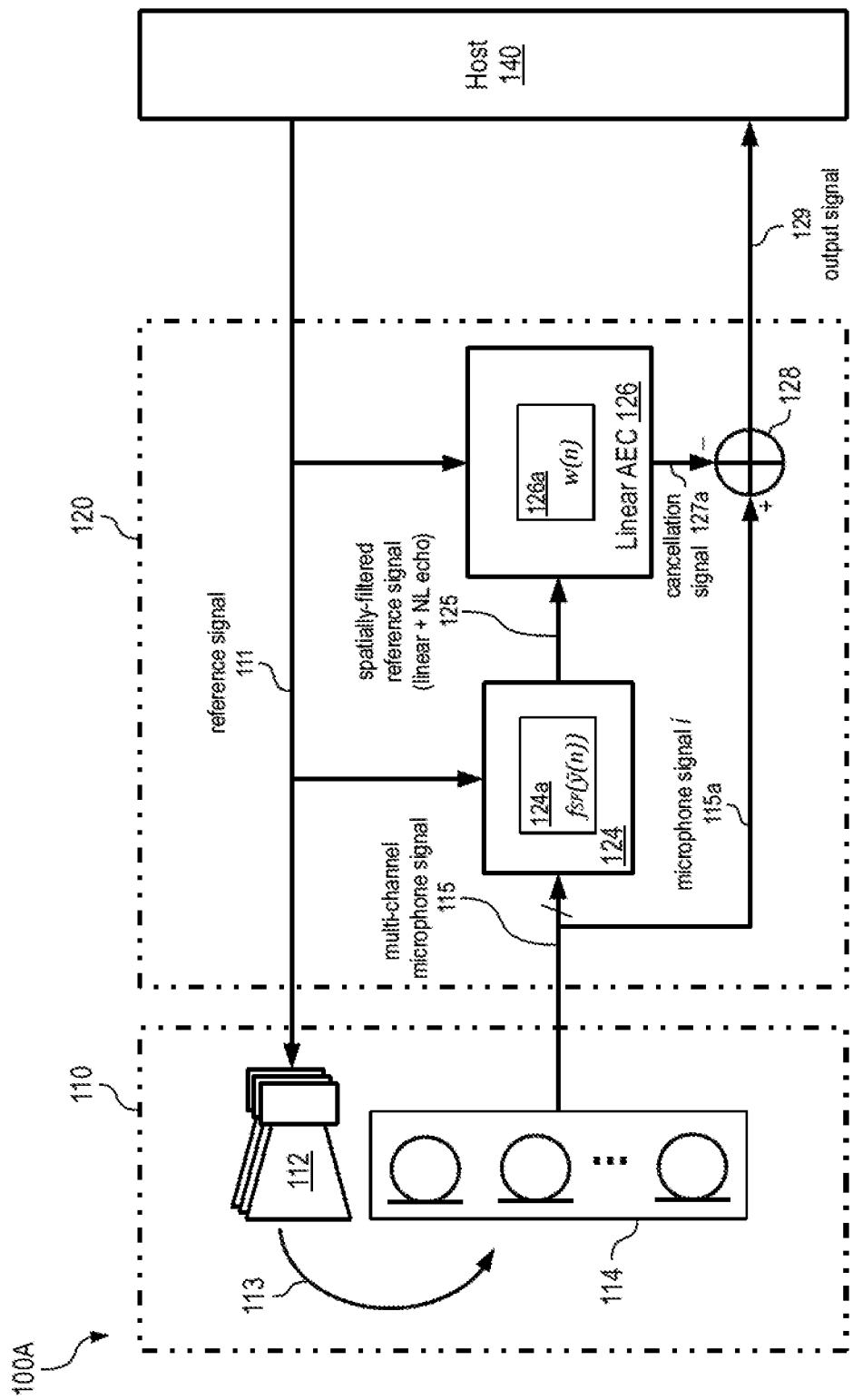
FIG. 1A-1C illustrate example systems for non-linear acoustic echo cancellation, according to some embodiments.

The following description sets forth numerous specific details such as examples of specific systems, components, methods, and so forth, in order to provide a good understanding of various embodiments of the described techniques for non-linear acoustic echo cancellation. It will be apparent to one skilled in the art, however, that at least some embodiments may be practiced without these specific details. In other instances, well-known components, elements, or methods are not described in detail or are presented in a simple block diagram format in order to avoid unnecessarily obscuring the subject matter described herein. Thus, the specific details set forth hereinafter are merely exemplary. Particular implementations may vary from these exemplary details and still be contemplated to be within the spirit and scope of the present invention.

Reference in the description to "an embodiment", "one embodiment", "an example embodiment", "some embodiments", and "various embodiments" means that a particular feature, structure, step, operation, or characteristic described in connection with the embodiment(s) is included in at least one embodiment of the invention. Further, the appearances of the phrases "an embodiment", "one embodiment", "an example embodiment", "some embodiments", and "various embodiments" in various places in the description do not necessarily all refer to the same embodiment(s). Reference to "cancel", "cancelling" and other verb derivatives thereof means removing fully or at least substantially an unwanted signal (e.g., such as linear or non-linear echo) from another signal (e.g., such as an output signal).

The description includes references to the accompanying drawings, which form a part of the detailed description. The drawings show illustrations in accordance with exemplary embodiments. These embodiments, which may also be referred to herein as "examples", are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Described herein are various embodiments of techniques for non-linear echo cancellation in devices that provide audio processing. Examples of such devices include, without limitation, personal computers (e.g., laptop computers, notebook computers, etc.), mobile computing devices (e.g., tablets, tablet computers, etc.), teleconferencing devices (e.g., speakerphones, etc.), mobile communication devices (e.g., smartphones, etc.), smartspeakers, printed circuit board (PCB) modules configured for audio processing, System-on-Chip (SoC) semiconductor devices and multi-chip semiconductor packages, Internet-of-Things (IoT) wireless devices, and other similar electronic, computing, and on-chip devices for audio processing.

In general, echo is a signal that results from transformation of acoustic and/or audio signals through the transfer functions of the components in an audio system. Such echo is typically unwanted because it may dominate a target speech signal. To remove unwanted echo, a front-end audio processing system typically uses an Acoustic Echo Canceller (AEC) to remove the echo signal from the target audio signal before it is sent to a back-end system. The back-end system, which may run on the cloud or on a local computer, needs the audio signal it receives to be as clean as possible. For example, a microphone coupled to the front-end system receives an acoustic (sound) wave and converts it to an analog audio signal, which is then digitized. However, the received acoustic wave may have been interfered with by nearby devices (e.g., a TV that is on, etc.) or by acoustic echo from a loudspeaker. For instance, a person (whose speech needs to be recognized) may be talking while a loudspeaker is playing back music or other multi-media content, and such playback is also captured by the microphone as echo along with the speech of the talker.

Since the transfer function of an audio system component can be linear and/or non-linear, an audio system typically generates both linear and non-linear echo. Linear echo is a signal that results from transformation of an acoustic/audio signal by a linear transfer function, whose output is a linear combination of its input signal(s). On the other hand, non-linear (NL) echo is a signal that results from transformation of the acoustic/audio signal by a non-linear transfer function, whose output is not a linear combination of its input signals. A non-linear transfer function does not meet one or more of the conditions for linearity, which require the output level to be proportional to the input level (homogeneity) and the response caused by two or more input signals to be the sum of the responses that would have been caused by each input signal individually (additivity). Thus, the echo in a typical audio system is a signal that results from transformation of an acoustic/audio signal through the linear and non-liner transfer functions of the components in the system including, for example, the transfer functions of the loudspeaker, the power amplifier, and the microphones of the system as well as the RIR transfer function that characterizes the propagation of the acoustic signal in the confined space and/or the physical surroundings of the system.

The AEC in a typical audio system has access only to linear reference signals, so it uses a linear filter that removes the linear echo from the target audio signal. However, the estimation models used by the linear filter in such AEC are not suitable to model any non-linearities in the captured acoustic signal because such non-linearities have non-homogeneous origins, may change over time, and are computationally very expensive and difficult to estimate. Thus, in a typical audio system with a linear AEC, any non-linear echo generated by the system remains in the target signal.

For example, a typical audio processing system may have various non-linearities with different non-linear transfer functions, and so the combined non-linear echo in such system may have multiple origins. The transfer functions of active components (e.g., transistors, amplifiers, power supplies, etc.) and of passive components (e.g., loudspeaker components such as cones and membranes, etc.) in the system may have non-linearities that can be the sources for signal distortions. When picked up by the microphone in the system, such non-linear signal distortions can be the cause of unwanted non-linear echo. In contrast to linear distortions (which are expected distortions caused by linear transfer functions), non-linear distortions are unexpected since they are caused (at least in part) by the current physical condition of the loudspeaker—e.g., such as fatigue in the loudspeaker components, wear and tear of the loudspeaker assembly, and the condition of the loudspeaker cone. The physical condition of the loudspeaker necessarily worsens with time, which further changes the non-linear distortions generated by its components. Further, operating the loudspeaker at or beyond its sound limits may also cause non-linear distortions because of unpredictable vibrations by the loudspeaker assembly and/or its components.

In addition, AEC processing is computationally very expensive. This problem is exacerbated in systems with limited computational power, such as embedded systems (e.g., SoCs), IoT devices that provide front-end processing for back-end automatic speech recognition systems (e.g., such as Amazon Alexa, Google Home, etc.), and edge devices (e.g., the entry points into IoT cloud-based services) that do not have the capability for extensive computations. Further, in some operational contexts echo cancellation is implemented in smartspeaker systems that need to recognize and respond to voice commands in real time. Thus, in such operational contexts the computational cost of AEC processing is a significant factor in the system response time.

The acoustic echo, produced when a signal played out of a loudspeaker is captured by a microphone, can be expressed per Equation (1) below:

$$d(n)=h(n)^T x(n) \quad (1)$$

where h(n) is a vector of the impulse response between the loudspeaker and a microphone, $(\cdot)^T$ is the transpose operator, x(n) is a vector of the reference (e.g., loudspeaker) signal, d(n) is a vector of the acoustic echo signal captured by the microphone, and n is a time index. In a conventional audio processing system, the objective of a linear AEC is to obtain the acoustic echo estimate signal $\hat{d}(n)$ using a linear filter with coefficients w(n), e.g., per Equation (2) below:

$$\hat{d}(n)=w(n)^T x(n) \quad (2)$$

such that the mean squared error is minimized over time, per Equation (3):

$$E[e(n)^2]=E[(y(n)-\hat{d}(n))^2] \quad (3)$$

where e(n) is the echo-cancelled output signal, y(n) is the microphone signal (which may contain other signals such as speech captured along with the acoustic echo), and $E[\cdot]$ is the expectation (averaging) operator.

The overall challenge for non-linear AECs is that the acoustic coupling between the loudspeaker and the microphone cannot simply be modeled linearly by Equation 2. One conventional approach to address this challenge is to generalize the problem by modeling the non-linearity with some closed-form function $f_{NL}$ that is mathematically tractable (e.g., Volterra filter, Hammerstein filter, neural network, etc.), e.g., per Equation (4) below:

$$\hat{d}(n)=f_{NL}(x(n)) \quad (4)$$

However, this conventional approach often becomes computationally impractical due to high complexity (e.g., $O(N^2)$ compared to $O(N)$ for linear adaptive filters, which can be prohibitive for real-time systems), exhibition of local minima (e.g., it does not cancel the echo all the way), slow convergence (e.g., it has a slow rate of echo cancellation), low accuracy (e.g., its echo-cancelled output signal is of poor quality), and numerical instability (e.g., it has limited numerical precision, which can cause the system to drift and become unstable over time). This conventional approach also suffers from lack of knowledge about the non-linearities in the actual audio system and their change over time (e.g., the physical condition of the loudspeaker), which makes it close to impossible to design a practical solution with a model that accounts for all possible non-linearities during the lifetime of the system.

Another conventional approach is to decouple the linear and the non-linear echo cancellation processing. For example, this conventional approach involves applying a pre-processing filter $f_{PRE}$ to the reference signal before the reference signal is applied to the linear filter of the AEC to best match the effect of a particular anticipated non-linearity, e.g., per Equation (5) below:

$$\hat{x}(n)=f_{PRE}(x(n)) \quad (5)$$

where $\hat{x}(n)$ is the transformed reference signal used by the linear filter to obtain the echo estimate per Equation (2) above. Although this conventional approach may be computationally feasible for some applications, it is not robust (e.g., it cannot account for the variety of the non-linearities in a real system) and fails to properly model the temporal variability in non-linearity (e.g., which is caused by gradual degradation of the physical condition of the loudspeaker).

To address these and other shortcomings of the conventional approaches, the techniques described herein provide for removing non-linear echo by applying a spatial filter to the loudspeaker reference signal. As long as the target talker and the loudspeaker are sufficiently spatially separated (which is the case in most, if not all applications that use microphone arrays, for example), spatial filtering can be performed specifically in the direction of the loudspeaker and/or in the direction of the talker. The spatially-filtered signal (e.g., with reduced amplitude and frequencies in some of its portions) is then used as a reference signal that is provided to an AEC with a linear filter. In this way, the techniques described herein provide for low computational complexity (e.g., since a linear AEC is used to cancel the non-linear echo) while at the same time providing robustness (e.g., since the non-linearities in the system can be tracked over time) and improved accuracy of the output signal (e.g., in comparison with conventional approaches). In addition, when the non-linearities in the system change over time, a system according to the described techniques does not require retuning as would be required under the conventional approaches.

In general, spatial filtering is a transformation of an input multi-channel signal measured at different spatial locations, such that its output signal depends only on its input signal. Examples of spatial filters include, without limitation, re-referencing filters, surface Laplacian filters, independent component analysis (ICA) filters, and common spatial patterns (CSP) filters. In practice, spatial filtering is commonly incorporated into audio processing systems that use beamformers. A beamformer (BF) is a signal processing mechanism that directs the spatial response of multiple microphones (e.g., in a microphone array) towards a target audio source, and thus naturally measures or otherwise collects all the parameters that are needed to construct a spatial filter.

According to the techniques for non-linear echo cancellation described herein, a spatial filter $f_{SF}$ is used to capture the effect of the non-linearities in an audio processing system. The spatial filter $f_{SF}$ generates a spatially-filtered reference signal $\tilde{x}(n)$, e.g., per Equation (6) below:

$$\tilde{x}(n) = f_{SF}(\bar{y}(n)) \tag{6}$$

where $\tilde{x}(n)$ is the spatially-filtered signal (which includes both linear and non-linear reference signals) that is steered towards the loudspeaker and is used for adaptive filtering, $\bar{y}(n)$ is the multi-channel signal received from the multiple microphones, and n is a time index.

In some embodiments, the techniques described herein may be implemented in an audio processing system with a single AEC that is applied to one of multiple microphone signals. In these embodiments, the spatially-filtered signal $\tilde{x}(n)$ is used as a reference signal that is provided to an AEC with a linear filter, to obtain the echo estimate signal d(n), e.g., per Equation (7) below:

$$\hat{d}(n) = w(n)^T \tilde{x}(n) \tag{7}$$

such that the mean squared error is minimized over time, e.g., per Equation (8) below:

$$E[e(n)^2] = E[(y_i(n) - w(n)^T \tilde{x}(n))^2] \tag{8}$$

where i=1, 2, ..., N and N is the number of microphones, $y_i(n)$ is the microphone signal from the $i^{th}$ microphone that is selected for processing, w(n) is a vector of linear filter coefficients of the AEC, $\tilde{x}(n)$ is the spatially-filtered reference signal (e.g., as generated per Equation (6) above), n is a time index, and $e(n) \approx s_i(n)$ is the target speech signal from the $i^{th}$ microphone that is provided as the echo-cancelled output signal.

In some embodiments, the techniques described herein may be implemented in an audio processing system with multiple linear AECs or with a multi-instance linear AEC that provide one linear AEC instance per microphone. In these embodiments, the same spatial filter $f_{SF}$ is used to steer towards a loudspeaker for extraction of the non-linear reference signal and towards a main talker for extraction of the target speech estimate signal $\tilde{s}(n)$. The speech estimate signal $\tilde{s}(n)$ can be obtained by applying the same spatial filter $f_{SF}$ to multi-channel output of AEC but with different coefficients, e.g., per Equation (9) below:

$$\tilde{s}(n) = f_{SF}(\bar{e}(n)) \tag{9}$$

as the mean squared error is minimized over time, e.g., per Equation (10) below:

$$E[e_i(n)^2] = E[(y_i(n) - w_i(n)^T \tilde{x}(n))^2] \tag{10}$$

where i=1, 2, ..., N and N is the number of microphones, $\bar{e}(n) = \bar{y}(n) - \hat{\bar{d}}(n) = [e_1(n), e_2(n), ..., e_N(n)]^T$ is a multi-channel output signal from the multi-instance (or multiple) linear AEC(s), $\hat{\bar{d}}(n) = [\hat{d}_1(n), \hat{d}_2(n), ..., \hat{d}_N(n)]^T$ is a vector of echo estimate $\hat{d}_i(n) = w_i(n)^T \tilde{x}(n)$, $y_i(n)$ is the microphone signal from the $i^{th}$ microphone, $w_i(n)$ is a vector of linear filter coefficients for the linear filters associated with the $i^{th}$ microphone, $\tilde{x}(n)$ is a spatially-filtered reference signal (e.g., as generated per Equation (6) above), n is a time index, and $\tilde{s}(n)$ (e.g., as generated per Equation (9) above) is the target speech estimate signal that is provided as the echo-cancelled output signal.

In some embodiments, the techniques described herein may be implemented in an audio processing system with a single linear AEC that is applied to an output from a spatial filter $f_{SF}$. In these embodiments, the spatial filter $f_{SF}$ is utilized with appropriate filter coefficients to extract the spatially-filtered reference signal $\tilde{x}(n)$ (e.g., as generated per Equation (6) above) and a spatially-filtered microphone signal $\tilde{y}(n)$. The spatially-filtered reference signal $\tilde{x}(n)$ is steered towards the loudspeaker to extract any non-linear reference signals. The spatially-filtered microphone signal $\tilde{y}(n)$ includes both a spatially-amplified speech estimate signal $\tilde{s}(n)$ and an attenuated echo estimate signal $\tilde{d}(n)$ (e.g., $\tilde{y}(n) = \tilde{d}(n) + \tilde{s}(n)$) and may be generated per Equation (11) below by using the appropriate spatial filter coefficients:

$$\tilde{y}(n) = f_{SF}(\bar{y}(n)) \tag{11}$$

such that the mean squared error is minimized over time, e.g., per Equation (12) below:

$$E[e(n)^2] = E[(\tilde{y}(n) - w(n)^T \tilde{x}(n))^2] \tag{12}$$

where $\tilde{y}(n)$ is the spatially-filtered microphone signal, $w_i(n)$ is a vector of linear filter coefficients of the linear AEC, $\tilde{x}(n)$ is a spatially-filtered reference signal (e.g., as generated per Equation (6) above), n is a time index, and $e(n) \approx \tilde{s}(n)$ is the target speech estimate signal that is provided as the echo-cancelled output signal.

In some embodiments, the techniques described herein can be used in a system with adaptive beamformers, which will naturally be able to capture and track the non-linearity changes in the system. In these embodiments, signal output from a BF block includes both linear and non-linear components of the reference signal, and therefore a linear AEC is able to cancel the non-linear portion of the echo. In addition, the techniques described herein are not limited to adaptive beamforming, but can be used with other spatial filtering techniques, e.g., switched beamforming, source separation (blind or semi-blind), etc.

Figure 1B:
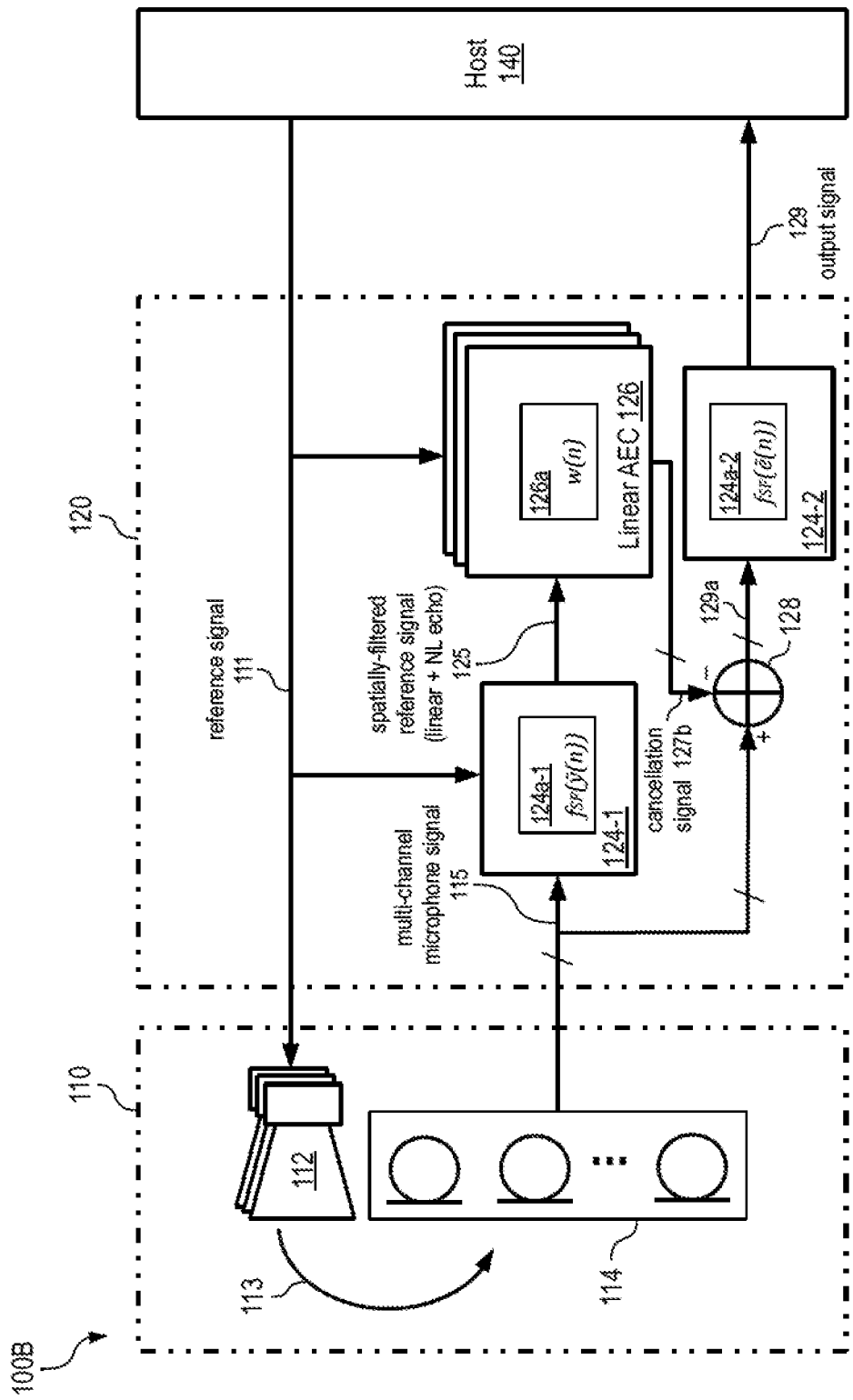
Figure 1C:
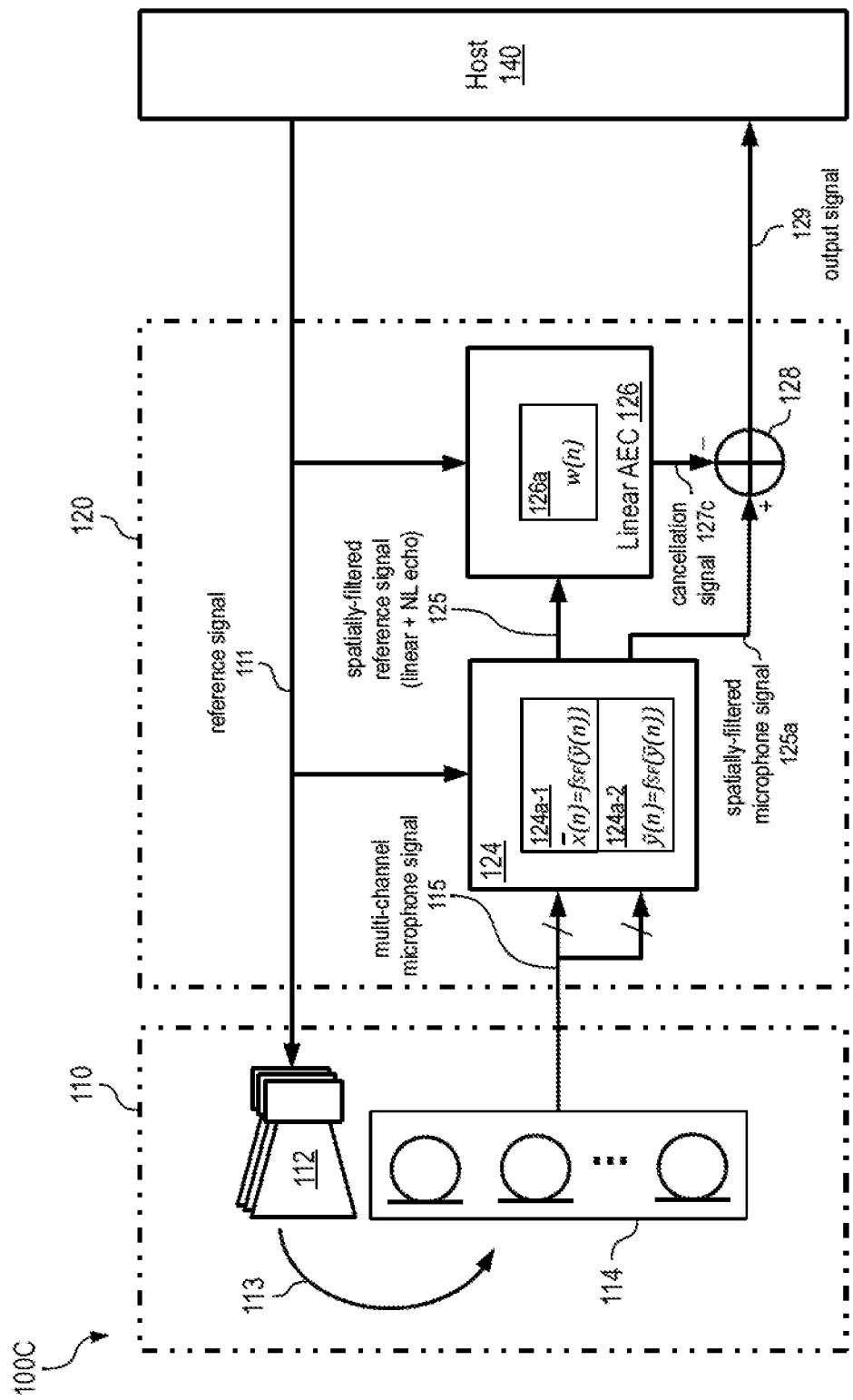

FIGS. 1A-1C illustrate systems 100A-100C, respectively, for non-linear acoustic echo cancellation according to example embodiments. In some embodiments (e.g., such as teleconferencing devices), the components of each system 100A-100C may be integrated into the same housing as a standalone apparatus. In other embodiments (e.g., smart-speaker systems), the components of each system 100A-100C may be separate elements that are coupled over one or more networks and/or communication lines. In other embodiments, the components of each system 100A-100C may be disposed in a fixed loudspeaker-microphone geometry that provides spatial separation of the loudspeaker to potential talkers. Thus, systems 100A-100C in FIGS. 1A-1C are to be regarded in an illustrative rather than a restrictive sense.

In FIGS. 1A-1C, similar reference numbers refer to similar components. Thus, each system 100A-100C in FIGS. 1A-1C includes a loudspeaker-microphone assembly 110 that is coupled to an audio processing device 120, which is coupled to a host 140. Audio processing device 120 includes spatial filtering logic 124, AEC logic 126, and adder logic block 128. As used herein, "logic" refers to hardware block(s) having one or more circuits that include various electronic components configured to process analog and/or digital signals and to perform one or more operations in response to control signal(s) and/or firmware instructions executed by a processor or an equivalent thereof. Examples of such electronic components include, without limitation, transistors, diodes, logic gates, state machines, micro-coded engines, and/or other circuit block(s) and analog/digital circuitry that may be configured to control hardware in response to control signals and/or firmware instructions.

Loudspeaker-microphone assembly 110 includes one or more loudspeakers 112 and microphone array 114 that are disposed in acoustic proximity, such that the microphone array can detect acoustic waves from wanted sound sources (e.g., human speech) and from unwanted sound sources (e.g., such as acoustic echo 113 from loudspeaker(s) 112). As used herein, "loudspeaker" refers to an electroacoustic speaker device configured to transform electric signals into acoustic/sound waves. Loudspeaker(s) 112 are configured to receive an analog audio signal from audio processing device 120, and to emit the audio signal as an acoustic wave. Microphone array 114 includes multiple microphones that are configured to receive acoustic waves from various sound sources and to transform the received acoustic waves into analog audio signals that are sent to audio processing device 120. In some embodiments (e.g., smartphones), loudspeaker(s) 112 and microphone array 114 may be integrally formed as the same assembly 110. In some embodiments, (e.g., teleconferencing devices), loudspeaker(s) 112 and microphone array 114 may be separate components that are disposed on a common substrate (e.g., a PCB) mounted within, or on, a housing of assembly 110. In yet other embodiments, assembly 110 may not have a housing but may be formed by virtue of the acoustic proximity of loudspeaker(s) 112 to microphone array 114.

Audio processing device 120 includes spatial filtering logic 124, AEC logic 126, and adder logic block 128. In some embodiments, audio processing device 120 may be a single-chip integrated circuit (IC) device manufactured on a semiconductor die or a single-chip IC that is manufactured as a SoC. In other embodiments, audio processing device 120 may be a multi-chip module encapsulated in a single semiconductor package or multiple semiconductor packages disposed or mounted on a common substrate, such as a PCB. In some embodiments, spatial filtering logic 124, AEC logic 126, and adder logic 128 may be implemented as hardware circuitry within a digital signal processor (DSP) of audio processing device 120. In various embodiments, audio processing device 120 may include additional components (not shown), such as audio input/output (I/O) logic, a central processing unit (CPU), memory, and one or more interfaces to connect to host 140.

In some embodiments spatial filtering logic 124 may implement, or may be implemented as part of, a BF logic that directs the spatial response of microphone array 114 towards a target audio source. For example, such BF logic may apply time delay compensation to the digital signal from each microphone in microphone array 114, in order to compensate for the relative time delays between the microphone signals that may be due to the position of the acoustic source relative to each microphone. The BF logic may also be configured to attenuate the digital signals from some of the microphones, to amplify the digital signals from other microphones, and/or to change the directionality of the digital signals from some or all of the microphones. In some embodiments, such BF logic may also use signals received from sensors in microphone array 114 in order to track a moving talker, and to adjust the digital signal from each microphone accordingly. In this way, the BF logic measures or otherwise collects the parameters that are needed to operate one or multiple instances of a spatial filtering logic configured to apply one or more spatial filters (or instances thereof) to its input signals.

According to the techniques described herein, the spatial filtering logic 124 is configured to apply a spatial filter (e.g., 124a in FIG. 1A, 124a-1 and 124a-2 in FIGS. 1B and 1C) to a multi-channel microphone signal that is received from microphone array 114. The spatial filtering logic 124 is configured to generate a spatially-filtered signal that is targeted in a particular direction towards a particular audio source. For example, in the embodiments of FIGS. 1A-1C, the spatial filtering logic 124 may perform spatial filtering in the direction of the loudspeaker(s) 112 in order to generate a spatially-filtered signal that includes both linear and non-linear echo. In other embodiments (e.g., FIG. 1C), the spatial filtering logic 124 may in addition perform spatial filtering in the direction of the talker (e.g., based on a multi-channel output signal) in order to generate a spatially-filtered signal that includes a speech estimate signal.

According to the techniques described herein, AEC logic 126 includes linear filter logic 126a to generate echo estimate signals that are canceled from the output signal that is ultimately sent to host 140. In some embodiments, logic 126a implements a linear adaptive filter whose output is a linear combination of its input and whose transfer function is controlled by variable parameters that can be adjusted during operation based on the output signal 129 that is generated by adder logic 128. (It is noted, however, that various embodiments of the techniques described herein may use various other types of linear filters). In general, adaptive filtering is a technique that continuously adjusts the filter coefficients of the AEC to reflect the changing acoustic environment (e.g., when a different talker starts to speak, when a microphone or a speaker is physically moved, etc.) to achieve as optimally filtered output as possible (e.g., by minimizing the residual echo energy across time per Equation (3) above). Adaptive filtering may be implemented sample-wise in the time domain or block-wise in the frequency domain across time. A typical implementation of a linear adaptive filter (e.g., such as logic 126a) may use background and foreground filtering. Background-foreground filtering is an adaptive filtering technique that involves two separate adaptive filters ("background" and "foreground") that are combined to maximize the system performance. The background filter is designed to be aggressive to adapt quickly and cancel as much echo as possible over a short time period at the cost of reduced noise stability, whereas the foreground filter is tuned conservatively to provide stable and optimal output from long-time perspective at the cost of slow convergence speed. In this manner, the foreground filter is able to keep converging even in the presence of noise, while the background filter is able to capture any fast variations and dynamics in the acoustic environment. In practice, a linear adaptive filter with background-foreground filtering is typically needed to handle barge-in and double-talk scenarios in a robust manner. "Double-talk" is a scenario that occurs during teleconferencing when a local/near-end talker and a remote/far-end talker speak simultaneously such that the local and the remote speech signals are captured by the local microphone at same time. "Barge-in" is a similar scenario as double-talk, except that a live remote talker is replaced by a device/machine that may be playing back either the captured speech signal itself or a multimedia signal such as music.

Adder logic 128 is a logic block that performs digital summing of its input digital signals and generates the output signal 129 (e.g., in systems 100A, 100C of FIGS. 1A, 1C) or the multi-channel output signal 129a (in system 100B of FIG. 1B). Digital summing involves adding and/or subtracting two or more signals together using element-wise indexing—e.g., the $n^{th}$ sample of one signal is added to or subtracted from the $n^{th}$ sample of another signal, and the result represents the $n^{th}$ sample of the output signal.

Host 140 is coupled to communicate with audio processing device 120. In some embodiments, host 140 may be implemented as a standalone device or as a computing system. For example, host 140 may be implemented on-chip with audio processing device 120 as a SoC device or an IoT edge device. In another example, host 140 may be implemented as a desktop computer, a laptop computer, a teleconferencing device (e.g., a speakerphone), etc. In other embodiments, host 140 may be implemented in a networked environment as a server computer or a server blade that is communicatively connected to audio processing device 120 over one or more networks.

In operation, audio processing device 120 receives audio data (e.g., a series of bytes) from host 140. The audio data may represent multi-media playback and/or far-end speech. Audio processing device 120 (e.g., one or more circuits thereof) ultimately converts the received audio data into reference signal x(n) 111 that is sent to loudspeaker(s) 112. The microphones in microphone array 114 pick up acoustic waves from near-end speech as well as acoustic echo 113 from loudspeaker(s) 112. The microphones in microphone array 114 convert the received acoustic waves into corresponding analog audio signals that are sent to audio processing device 120. Audio processing device 120 (e.g., one or more circuits thereof) receives the analog audio signals and converts them into a multi-channel digital microphone signal y(n) 115, which is sent to the spatial filtering logic 124 for processing in accordance with the techniques described herein. The parameters (e.g., such as direction, self/cross-channel statistics, optimization function, etc.) needed by the spatial filter may be determined by the spatial filtering logic 124 that performs beamforming with respect to the multi-channel microphone signal received from microphone array 114.

FIG. 1A illustrates an example system 100A with a single AEC logic 126. In system 100A, spatial filtering logic 124 applies a spatial filter $f_{SF}$ 124a to multi-channel microphone signal $\bar{y}(n)$ 115 and generates a spatially-filtered signal $\tilde{x}(n)=f_{SF}(\bar{y}(n))$ 125 (e.g., per Equation (6) above). Spatially-filtered signal $\tilde{x}(n)$ 125 is provided to AEC logic 126 and carries both the linear and non-linear echo that is included in the multi-channel signal $\bar{y}(n)$ 115—e.g., for each time index n, the value sampled from signal 125 reflects both the linear echo and the non-linear echo that is picked up by the microphones in microphone array 114. AEC logic 126 adaptively computes the coefficients w(n) for linear adaptive filter 126a. Linear adaptive filter logic 126a is then applied to the spatially-filtered signal $\tilde{x}(n)$ 125 (e.g., per Equations (7) and (8) above) to generate the cancellation signal $\hat{d}(n)$ 127a. The cancellation signal d(n) 127a estimates both the linear echo and the non-linear echo signals that are included in the $i^{th}$ microphone signal $y_i(n)$ 115a. The cancellation signal $\hat{d}(n)$ 127a and one (e.g., the $i^{th}$) of the microphone signals of multi-channel signal $\bar{y}(n)$ 115 are provided as input to adder logic 128. The $i^{th}$ microphone signal $y_i(n)$ may be predetermined (e.g., based on the known/fixed disposition of loudspeaker(s) 112 with respect to microphone array 114), or may be selected randomly from the channels of multi-channel microphone signal $\bar{y}(n)$ 115 during operation. Adder logic 128 performs digital summing based on the cancellation signal $\hat{d}(n)$ 127a and on the selected multi-channel microphone signal $y_i(n)$ 115, and generates output signal e(n) 129 (e.g., per Equation (8) above). In effect, the output signal e(n) 129 approximates the target speech signal s(n) that is captured by the $i^{th}$ microphone (e.g., $e(n) \simeq s_i(n)$). In this manner, both the linear and non-linear echo signals are cancelled from output signal e(n) 129. Output signal e(n) 129 is then provided to host 140. In addition, output signal e(n) 129 is also provided as feedback to AEC logic 126, which uses it to adaptively compute the coefficients w(n) for linear adaptive filter 126a.

In the embodiment of FIG. 1A, reference signal x(n) 111 is provided to both loudspeaker(s) 112 and AEC logic 126. AEC logic 126 is configured to utilize both reference signal x(n) 111 and the spatially-filtered signal $\tilde{x}(n)$ 125. For example, AEC logic 126 may be configured to use reference signal x(n) 111 for double-talk detection (DTD). AEC logic 126 may also be configured to use the spatially-filtered signal $\tilde{x}(n)$ 125 for its background filter and to use the reference signal x(n) 111 for its foreground filter, where one (e.g., "best") of the outputs from the background filter and the foreground filter is selected to minimize the cancellation of near-end speech during double-talk situations.

FIG. 1B illustrates an example system 100B that includes multiple instances of AEC logic 126, with one AEC instance applied per microphone signal/channel. In system 100B, spatial filtering logic 124-1 applies instance 124a-1 of a spatial filter $f_{SF}$ to multi-channel microphone signal $\bar{y}(n)$ 115 and generates a spatially-filtered signal $\tilde{x}(n)=f_{SF}(\bar{y}(n))$ 125 (e.g., per Equation (6) above). Spatially-filtered signal $\tilde{x}(n)$ 125 is provided to each of the multiple instances of AEC logic 126 and carries both the linear and non-linear echo that is included in the multi-channel signal $\bar{y}(n)$ 115. Each instance of AEC logic 126 adaptively computes the coefficients $w_i(n)$ for its linear adaptive filter 126a, which is applied individually to the spatially-filtered signal $\tilde{x}(n)$ 125 (e.g., per Equation (10) above) to generate the cancellation signal $\hat{\bar{d}}(n)$ 127b. Thus, the cancellation signal $\hat{\bar{d}}(n)$ 127b is a multi-channel echo estimate signal that estimates both the linear echo and the non-linear echo signals that are included in the multi-channel microphone signal $\bar{y}(n)$ 115. The multi-channel cancellation signal $\hat{\bar{d}}(n)$ 127b and the multi-channel microphone signal $\bar{y}(n)$ 115 are provided as input to adder logic 128. Adder logic 128 performs digital summing based on the multi-channel cancellation signal $\bar{\hat{d}}(n)$ 127b and the multi-channel microphone signal $\bar{y}(n)$ 115, and generates multi-channel output signal $\bar{e}(n)$ 129a. The spatial filtering logic 124-2 applies instance 124a-2 of the same spatial filter $f_{SF}$ (e.g., but possibly with different coefficients) to the multi-channel output signal $\bar{e}(n)$ 129a and generates a spatially-filtered signal $\tilde{s}(n)=f_{SF}(\bar{e}(n))$ 129 (e.g., per Equation (9) above). In various embodiments, spatial filtering logic 124-2 may also be configured to receive one or more of the reference signal $x(n)$ 111, the multi-channel microphone signal $\bar{y}(n)$ 115, and/or the multi-channel cancellation signal $\bar{\hat{d}}(n)$ 127b, and to use any and/or all of these signals when generating the multi-channel output signal $\bar{e}(n)$ 129a. In effect, the output signal $e(n)$ 129 approximates the target speech signal $s(n)$ that is captured by the microphones in microphone array 114 (e.g., $e(n)\,s(n)$). In this manner, both the linear and non-linear echo signals are cancelled from output signal $e(n)$ 129. Output signal $e(n)$ 129 is then provided to host 140. In addition, the multi-channel output signal $\bar{e}(n)$ 129a is also provided as feedback to the multiple instances of AEC logic 126, which use it to adaptively compute the coefficients $w_i(n)$ for its respective linear adaptive filters 126a.

In the embodiment of FIG. 1B, reference signal $x(n)$ 111 is provided to both loudspeaker(s) 112 and to one or more instances of AEC logic 126. The one or more instances of AEC logic 126 are configured to utilize both reference signal $x(n)$ 111 and the spatially-filtered signal $\tilde{x}(n)$ 125. For example, one or more instances of AEC logic 126 may be configured to use reference signal $x(n)$ 111 for DTD. Each instance of AEC logic 126 may also be configured to use the spatially-filtered signal $\tilde{x}(n)$ 125 for its background filter and to use the reference signal $x(n)$ 111 for its foreground filter, where one (e.g., "best") of the outputs from the background filter and the foreground filter is selected to minimize the cancellation of near-end speech during double-talk situations.

FIG. 1C illustrates an example system 100C that includes a single AEC logic 126, which is applied to the spatial filter output. In system 100C, spatial filtering logic 124 applies one instance 124a-1 of a spatial filter $f_{SF}$ to multi-channel microphone signal $y(n)$ 115 and generates a spatially-filtered signal $\tilde{x}(n)=f_{SF}(AO$ 125 (e.g., per Equation (6) above). Spatially-filtered signal $\tilde{x}(n)$ 125 is generated with filter coefficients directed to loudspeaker(s) 112, and thus carries both the linear and non-linear echo that is included in the multi-channel signal $\bar{y}(n)$ 115. In addition, spatial filtering logic 124 applies another instance 124a-2 of the same spatial filter $f_{SF}$ to multi-channel microphone signal $y(n)$ 115 and generates a spatially-filtered microphone signal $\tilde{y}(n)=f_{SF}(\bar{y}(n))$ 125a (e.g., per Equation (11) above). Spatially-filtered microphone signal $\tilde{y}(n)$ 125a is generated with filter coefficients directed to the microphones in microphone array 114, and thus carries both a spatially-amplified speech estimate signal $\tilde{s}(n)$ and an attenuated echo estimate signal $\tilde{d}(n)$ (e.g., $\tilde{y}(n)=\tilde{d}(n)+\tilde{s}(n)$) that are included in the multi-channel signal $\bar{y}(n)$ 115. Spatially-filtered signal $\tilde{x}(n)$ 125 is provided as input to AEC logic 126, and spatially-filtered microphone signal $\tilde{y}(n)$ 125a is provided as input to adder logic 128. AEC logic 126 adaptively computes the coefficients $w(n)$ for linear adaptive filter 126a, which is applied to the spatially-filtered signal $\tilde{x}(n)$ 125 to generate the cancellation signal $\hat{d}(n)$ 127c (e.g., per Equation (12) above). The cancellation signal $\hat{d}(n)$ 127c estimates both the linear echo and the non-linear echo signals that are included in the spatially-filtered microphone signal $\tilde{y}(n)$ 115. The cancellation signal $\hat{d}(n)$ 127c is provided as input to adder logic 128. Adder logic 128 performs digital summing based on the cancellation signal $\hat{d}(n)$ 127c and on the spatially-filtered microphone signal $\tilde{y}(n)$ 125a, and generates output signal $e(n)$ 129 (e.g., per Equation (12) above). In effect, the output signal $e(n)$ 129 approximates the target speech signal $s(n)$ that is captured by the microphones in microphone array 114 (e.g., $e(n)\,s(n)$). In this manner, both the linear and non-linear echo signals are cancelled from output signal $e(n)$ 129, and the cancellation of the target speech signal from the output signal $e(n)$ is avoided (e.g., in double-talk situations). Output signal $e(n)$ 129 is then provided to host 140. In addition, output signal $e(n)$ 129 is also provided as feedback to AEC logic 126, which uses it to adaptively compute the coefficients $w(n)$ for linear adaptive filter 126a.

In the embodiment of FIG. 1C, reference signal $x(n)$ 111 is provided to both loudspeaker(s) 112 and AEC logic 126. AEC logic 126 is configured to utilize both reference signal $x(n)$ 111 and the spatially-filtered signal $\tilde{x}(n)$ 125. For example, AEC logic 126 may be configured to use reference signal $x(n)$ 111 for DTD. AEC logic 126 may also be configured to use the spatially-filtered signal $\tilde{x}(n)$ 125 for its background filter and to use the reference signal $x(n)$ 111 for its foreground filter, where one (e.g., "best") of the outputs from the background filter and the foreground filter is selected to minimize the cancellation of near-end speech during double-talk situations.

Figure 2A:
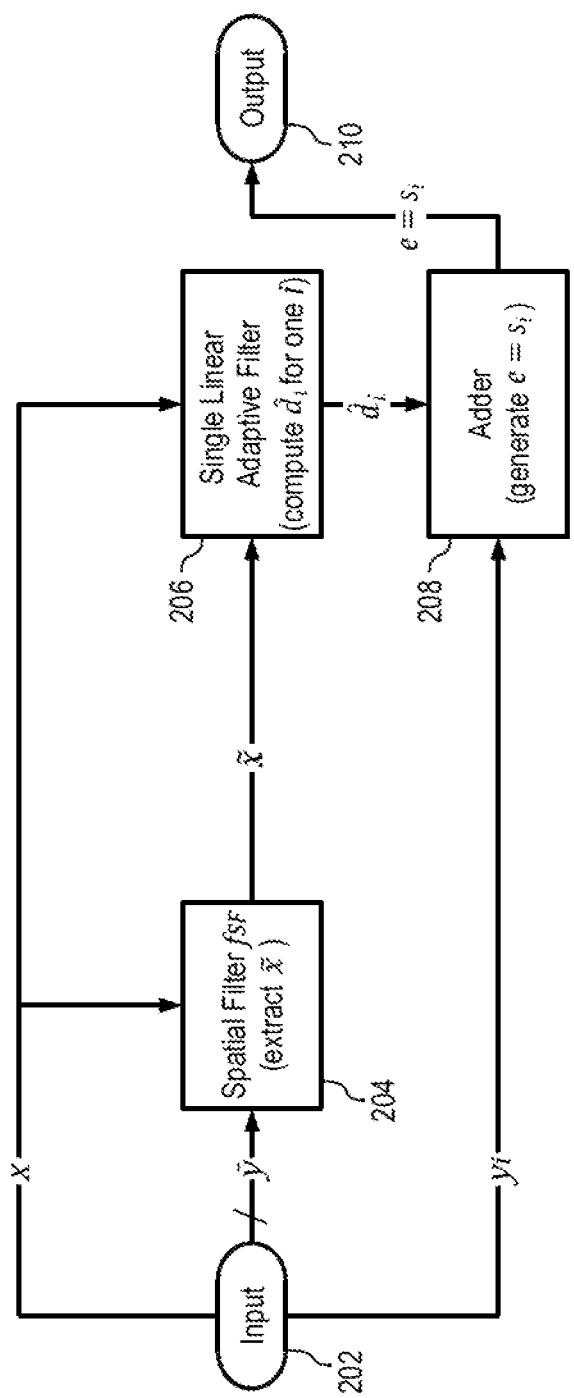
FIG. 2A-2C illustrate flow diagrams of example methods for non-linear acoustic echo cancellation, according to some embodiments.
Figure 2B:
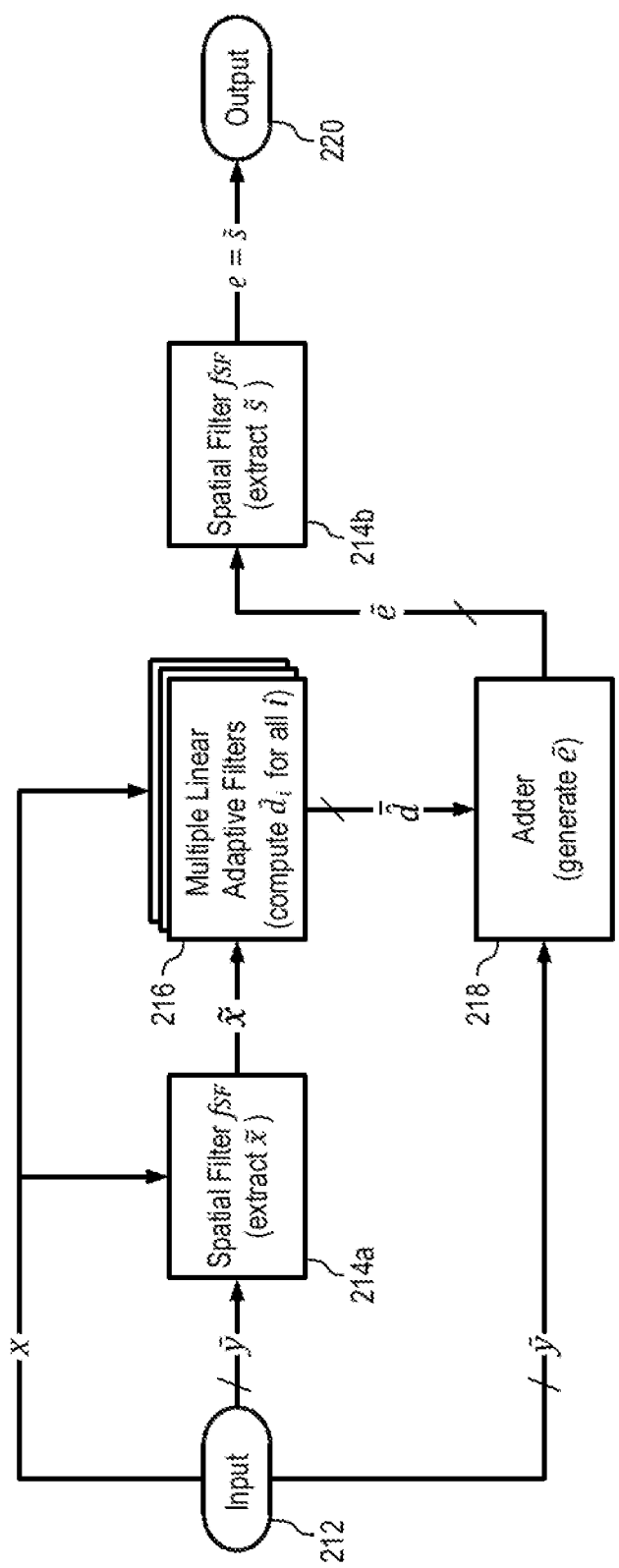
Figure 2C:
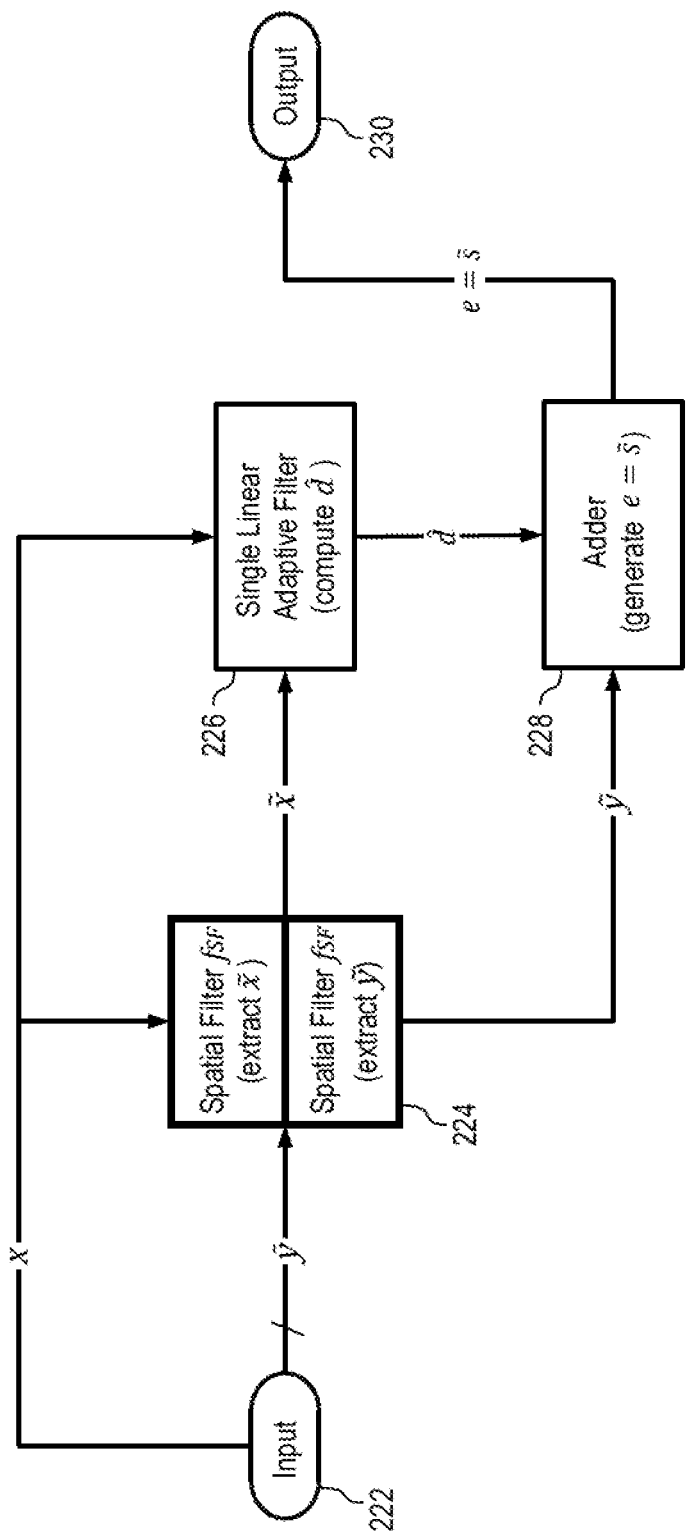

FIGS. 2A-2C illustrate flow diagrams of example methods for non-linear acoustic echo cancellation, according to the techniques described herein. The operations of the methods in FIGS. 2A-2C are described below as being performed by a spatial filtering logic, an AEC logic, and an adder logic (e.g., such as spatial filtering logic 124, AEC logic 126 and adder logic 128 in audio processing device 120 of FIGS. 1A-1C). It is noted, however, that various implementations and embodiments may use various, and possibly different, components to perform the operations of the methods in FIGS. 2A-2C. For example, in various embodiments various semiconductor devices—e.g., a SoC, a field programmable gate array (FPGA), a programmable logic device (PLD), an Application Specific Integrated Circuit (ASIC), or other integrated circuit device—may be configured with firmware instructions which, when executed by a processor and/or other hardware components (e.g., microcontrollers, state machines, and the like), are operable to perform the operations of the methods in FIGS. 2A-2C. In another example, in various embodiments an IC device may include a single-chip or multi-chip audio controller configured to perform the operations of the methods in FIGS. 2A-2C. Thus, the description hereinafter of the methods in FIGS. 2A-2C as being performed by a spatial filtering logic, an AEC logic, and an adder logic in an audio processing device, is to be regarded in an illustrative rather than a restrictive sense.

FIG. 2A illustrates a method for non-linear echo cancellation that can be implemented in a system with a single AEC logic (e.g., such as system 100A in FIG. 1A). In FIG. 2A, a reference signal $x$ and a multi-channel microphone digital signal $\bar{y}$ are provided as input to a spatial filtering logic with a spatial filter $f_{SF}$ in an audio processing device, per input operation 202. For example, a reference signal $x$ that is otherwise provided for emission to a loudspeaker, is continuously provided to the spatial filtering logic and the AEC logic. The multi-channel microphone digital signal $\bar{y}$ is a digital multi-channel signal that is generated based on audio signals from multiple microphones in a microphone array that is in acoustic proximity to the loudspeaker. Thus, multi-channel microphone digital signal $\bar{y}$ includes both the linear echo and the non-linear echo that is picked up by the microphones in the microphone array. As part of operation 202, one (e.g., the $i^{th}$) of the microphone signals of the multi-channel microphone signal $\bar{y}$ is also provided as input to an adder logic of the audio processing device. The $i^{th}$ microphone signal $y_i$ may be predetermined (e.g., based on the known/fixed disposition of the loudspeaker with respect to the microphone array), or may be selected randomly from the channels of multi-channel microphone signal y during operation.

In operation 204, the spatial filter $f_{SF}$ in the spatial filtering logic is applied to the multi-channel microphone signal y based on the reference signal x, and a spatially-filtered signal $\tilde{x}=f_{SF}(\bar{y})$ is generated (e.g., per Equation (6) above). The generated spatially-filtered signal $\tilde{x}$ carries both the linear echo and the non-linear echo that are included in the $i^{th}$ signal $y_i$. The spatially-filtered signal $\tilde{x}$ is then provided as input to a linear AEC logic of the audio processing device.

In operation 206, the AEC logic adaptively computes the coefficients w for its linear adaptive filter. The AEC logic applies the linear adaptive filter with its coefficients w to the spatially-filtered signal $\tilde{x}$ (e.g., per Equations (7) and (8) above) to generate a cancellation signal $\hat{d}$. The cancellation signal d estimates both the linear echo and the non-linear echo signals that are included in the $i^{th}$ microphone signal $y_i$. The cancellation signal $\hat{d}$ is then provided as input to the adder logic. In addition, in some embodiments the AEC logic may be configured to utilize both the reference signal x and the spatially-filtered signal $\tilde{x}$. For example, the AEC logic may be configured to use the reference signal x for DTD. The AEC logic may also be configured to use the spatially-filtered signal $\tilde{x}$ for its background filter and to use the reference signal x for its foreground filter, and to select one (e.g., "best") of the outputs from the background filter and the foreground filter to minimize the cancellation of near-end speech during double-talk situations.

In operation 208, the adder logic receives the cancellation signal $\hat{d}$ and the $i^{th}$ microphone signal $y_i$. The adder logic performs digital summing based on the cancellation signal d and on the $i^{th}$ microphone signal $y_i$, and generates output signal e (e.g., per Equation (8) above). In effect, the output signal e approximates the target speech signal s that is captured by the $i^{th}$ microphone (e.g., $e \approx s_i$). In this manner, both the linear and non-linear echo signals are cancelled from the output signal e.

In operation 210, the output signal e is provided as output (e.g., to a host application). In addition, the output signal e may also be provided as feedback to the AEC logic, which uses it to adaptively compute the linear adaptive coefficients w.

FIG. 2B illustrates a method for non-linear echo cancellation that can be implemented in a system with multiple instances of AEC logic, with one AEC instance applied per microphone signal/channel (e.g., such as system 100B in FIG. 1B). In FIG. 2B, a reference signal x and a multi-channel microphone digital signal $\bar{y}$ are provided as input to a spatial filtering logic with a spatial filter $f_{SF}$ in an audio processing device, per input operation 212. For example, a reference signal x that is otherwise provided for emission to a loudspeaker, is continuously provided to the spatial filtering logic. The multi-channel microphone digital signal $\bar{y}$ is a digital multi-channel signal that is generated based on audio signals from multiple microphones in a microphone array that is in acoustic proximity to the loudspeaker. Thus, the multi-channel microphone digital signal $\bar{y}$ includes both the linear echo and the non-linear echo that is picked up by the microphones in the microphone array. As part of operation 212, reference signal x is also provided to one or of the instances of the AEC logic, and the multi-channel microphone signal $\bar{y}$ is also provided as input to an adder logic of the audio processing device.

In operation 214a, the spatial filter $f_{SF}$ in the spatial filtering logic is applied to the multi-channel microphone signal y based on the reference signal x, and a spatially-filtered signal $\tilde{x}=f_{SF}(\bar{y})$ is generated (e.g., per Equation (6) above). The generated spatially-filtered signal $\tilde{x}$ carries both the linear echo and the non-linear echo that are included in the multi-channel signal $\bar{y}$. The spatially-filtered signal $\tilde{x}$ is then provided as input to each of the multiple instances of a linear AEC logic of the audio processing device.

In operation 216, each instance of the AEC logic adaptively computes the coefficients $w_i$ for its respective linear adaptive filter. Each instance of the AEC logic applies its linear adaptive filter with its respective coefficients $w_i$ to the spatially-filtered signal $\tilde{x}$ (e.g., per Equation (10) above) to generate a cancellation signal $\hat{\bar{d}}$. Thus, the cancellation signal $\hat{\bar{d}}$ is a multi-channel echo estimate signal that estimates both the linear echo and the non-linear echo signals that are included in all microphone signals $y_i$ of the multi-channel microphone signal $\bar{y}$. The multi-channel cancellation signal $\hat{\bar{d}}$ is then provided as input to the adder logic. In addition, in some embodiments one or more instances of the AEC logic may be configured to utilize both the reference signal x and the spatially-filtered signal $\tilde{x}$. For example, one or more instances of the AEC logic may be configured to use the reference signal x for DTD. Each instance of the AEC logic may also be configured to use the spatially-filtered signal $\tilde{x}$ for its background filter and to use the reference signal x for its foreground filter, and to select one (e.g., "best") of the outputs from the background filter and the foreground filter to minimize the cancellation of near-end speech during double-talk situations.

In operation 218, the adder logic receives the multi-channel cancellation signal $\hat{\bar{d}}$ and the multi-channel microphone signal $\bar{y}$. The adder logic performs digital summing based on the multi-channel cancellation signal $\hat{\bar{d}}$ and on the multi-channel microphone signal $\bar{y}$, and generates multi-channel output signal $\bar{e}$ (e.g., per Equation (10) above). The multi-channel output signal $\bar{e}$ is provided as input to the spatial filter $f_{SF}$ in the spatial filtering logic, for operation 214b.

In operation 214b, the spatial filter $f_{SF}$ in the spatial filtering logic is applied to the multi-channel output signal $\bar{e}$ (e.g., with the appropriate filter coefficients), in order to generate a spatially-filtered output signal $\tilde{s}=f_{SF}(\bar{e})$ (e.g., per Equation (9) above). In various embodiments, the spatial filter $f_{SF}$ in operation 214b may also be configured to receive one or more of the reference signal x, the multi-channel microphone signal $\bar{y}$, and/or the multi-channel cancellation signal $\hat{\bar{d}}$, and to use any and/or all of these signals when generating the multi-channel output signal $\bar{e}$. In effect, the output signal e approximates the target speech signal s that is captured by the microphones in the microphone array (e.g., $e \approx \tilde{s}$). In this manner, both the linear and non-linear echo signals are cancelled from the output signal e.

In operation 220, the output signal e is then provided as output (e.g., to a host application). In addition, the multi-channel output signal $\bar{e}$ may also be provided as feedback to each instance of the AEC logic, which uses it to adaptively compute its respective linear adaptive coefficients $w_i$ for its respective linear adaptive filter.

FIG. 2C illustrates a method for non-linear echo cancellation that can be implemented in a system with a single AEC logic that is applied to the spatial filter output (e.g., such as system 100C in FIG. 1C). In FIG. 2C, a reference signal x and a multi-channel microphone digital signal $\bar{y}$ are provided as input to a spatial filtering logic with a spatial filter $f_{SF}$ in an audio processing device, per input operation 222. For example, a reference signal x that is otherwise provided for emission to a loudspeaker, is continuously provided to the spatial filtering logic. The reference signal x is also provided as input to an AEC logic of the audio processing device. The multi-channel microphone digital signal y is a digital multi-channel signal that is generated based on audio signals from multiple microphones in a microphone array that is in acoustic proximity to the loudspeaker. Thus, the multi-channel microphone digital signal y includes both the linear echo and the non-linear echo that is picked up by the microphones in the microphone array.

In operation 224, the spatial filter $f_{SF}$ in the spatial filtering logic is applied to the multi-channel microphone signal $\bar{y}$ based on the reference signal x, and a spatially-filtered signal $\tilde{x}=f_{SF}(\bar{y})$ is generated (e.g., per Equation (6) above). The generated spatially-filtered signal $\tilde{x}$ carries both the linear echo and the non-linear echo that are included in the multi-channel signal $\bar{y}$. Also as part of operation 224, the same or different instance of the spatial filter $f_{SF}$ in the spatial filtering logic is applied to multi-channel microphone signal y to generate a spatially-filtered microphone signal $\tilde{y}=f_{SF}(\bar{y})$ (e.g., per Equation (11) above). The spatially-filtered microphone signal $\tilde{y}$ is generated with filter coefficients directed to the microphones in the microphone array, and thus carries both a spatially-amplified speech estimate signal $\tilde{s}$ and an attenuated echo estimate signal $\tilde{d}$ (e.g., $\tilde{y}=\tilde{d}+\tilde{s}$) that are included in the multi-channel signal $\bar{y}$. After generation, the spatially-filtered signal $\tilde{x}$ is provided as input to a linear AEC logic, and the spatially-filtered microphone signal $\tilde{y}$ is provided as input to an adder logic of the audio processing device.

In operation 226, the AEC logic adaptively computes the coefficients w for its linear adaptive filter. The AEC logic applies the linear adaptive filter with its coefficients w to the spatially-filtered signal $\tilde{x}$ (e.g., per Equation (12) above) to generate a cancellation signal $\hat{d}$. The cancellation signal $\hat{d}$ estimates both the linear echo and the non-linear echo signals that are included in the spatially filtered microphone signal $\tilde{y}$. The cancellation signal d is then provided as input to the adder logic. In addition, in some embodiments the AEC logic may be configured to utilize both the reference signal x and the spatially-filtered signal $\tilde{x}$. For example, the AEC logic may be configured to use the reference signal x for DTD. The AEC logic may also be configured to use the spatially-filtered signal $\tilde{x}$ for its background filter and to use the reference signal x for its foreground filter, and to select one (e.g., "best") of the outputs from the background filter and the foreground filter to minimize the cancellation of near-end speech during double-talk situations.

In operation 228, the adder logic receives the cancellation signal d and the spatially-filtered microphone signal $\tilde{y}$. The adder logic performs digital summing based on the cancellation signal $\hat{d}$ and the spatially-filtered microphone signal $\tilde{y}$, and generates output signal e (e.g., per Equation (12) above). In effect, the output signal e approximates the target speech signal s that is captured by the microphones in microphone array (e.g., $e \approx \tilde{s}$). In this manner, both the linear and non-linear echo signals are cancelled from the output signal e, and the cancellation of the target speech signal from the output signal e is avoided (e.g., in double-talk situations).

In operation 230, the output signal e is then provided as output (e.g., to a host application). In addition, the output signal e may also be provided as feedback to the AEC logic, which uses it to adaptively compute the linear adaptive coefficients w.

The techniques described herein provide significant improvements that make it possible to apply non-linear echo cancellation in embedded systems, edge devices, and other systems with limited computing power. For example, conventional non-linear echo cancellation approaches typically result in solutions that are either computationally too expensive (e.g., Volterra filters, Hammerstein filters, neural networks, etc.) or are not robust enough to account for changes in non-linearities over time (e.g., pre-processing filters). In contrast, the techniques described herein provide a practical, robust solution that uses linear filers to cancel non-linear echo, which is both robust and computationally suitable for systems/devices with limited computing power.

Figure 3A:
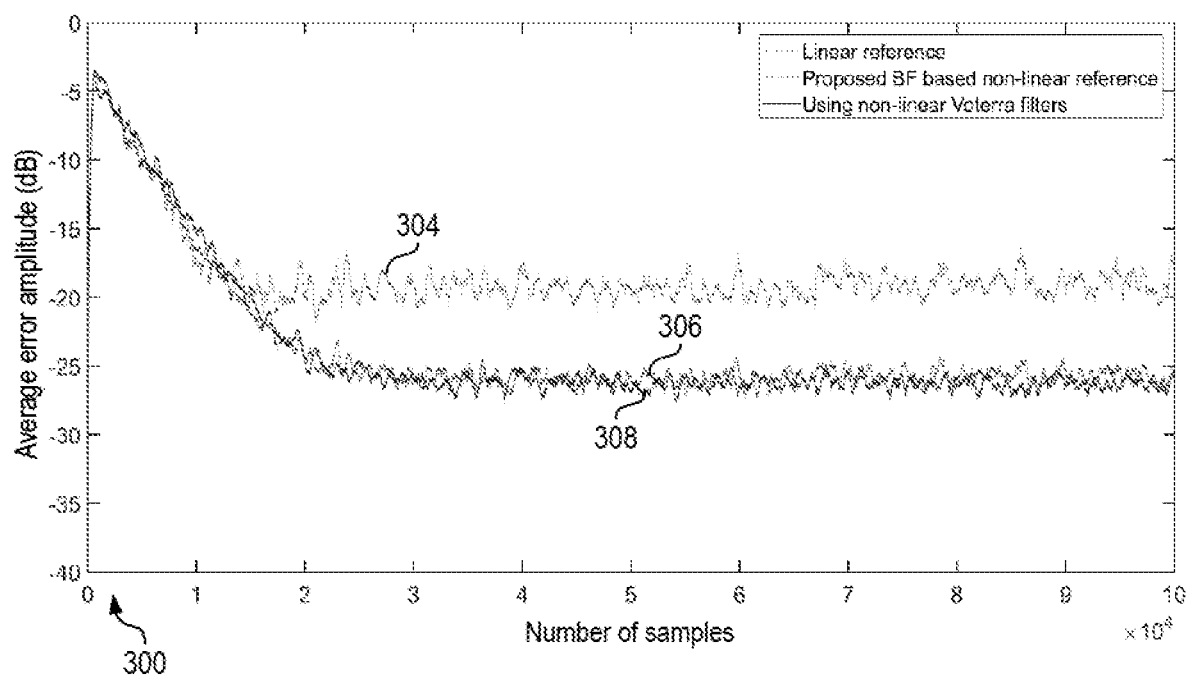
FIGS. 3A-3B illustrate diagrams from a simulation study reflecting the described techniques for non-linear acoustic echo cancellation.
Figure 3B:
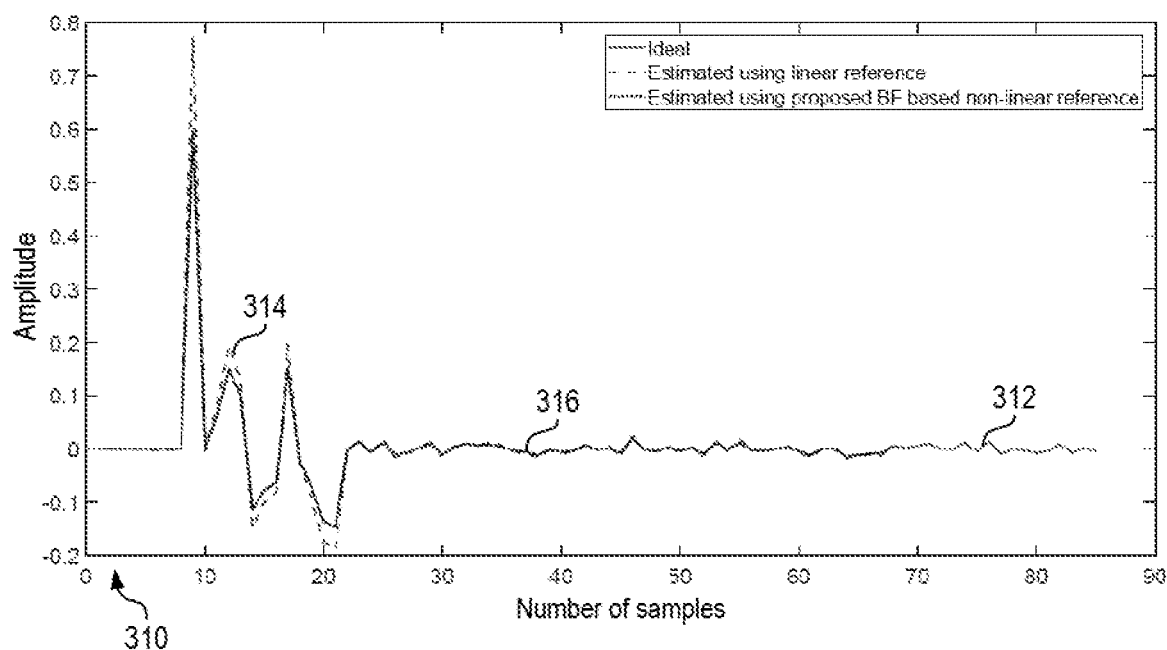

FIGS. 3A-3B illustrate diagrams from a simulation study that was carried out to verify the effectiveness of a proposed solution based on the techniques for non-linear echo cancellation described herein. In general, such simulation studies are reliable mechanisms for predicting signal processing results and are often used as the first step in building practical solutions in the digital signal processing area. The particular simulation study reflected in FIG. 3A was set up to simulate a system with 6 circular microphones arranged uniformly in a radius of 3 cm. The non-linearities in the simulated system were modeled using $2^{nd}$ and $3^{rd}$ order polynomial approximation typically found in consumer loudspeakers. The linear impulse response of the simulated system was modeled using 85 delay-line taps, which were set to run at 15 kHz to simulate multiple echoes from the same source signal. The linear adaptive filter of the system was under-modeled by 20% to emulate practical conditions.

FIG. 3A illustrates plot 300 of the average error amplitudes for three different echo cancellation mechanisms. Specifically, line 304 illustrates the error amplitude results for an AEC that uses a conventional linear adaptive filter without non-linear echo cancellation. Line 306 illustrates the error amplitude results for an AEC that uses a linear adaptive filter for non-linear echo cancellation in accordance with the techniques described herein. Line 308 illustrates the error amplitude results for an AEC that uses a non-linear Volterra filter to perform non-linear echo cancellation for a "known" non-linearity. As illustrated in FIG. 3A, the non-linear echo cancellation according to the techniques described herein (line 306) has almost the same convergence as an AEC with a linear filter (line 304) that does not perform non-linear echo cancellation, but provides an extra 10 dB of extra cancellation when compared to the AEC with the linear filter (line 304). At the same time, the non-linear echo cancellation according to the techniques described herein (line 306) has echo cancellation performance that is substantially equivalent to an AEC with a non-linear Volterra filter for a "known" linearity (line 308).

FIG. 3B illustrates plot 310 of the modeled linear response using the techniques for non-linear echo cancellation described herein (line 316) versus a conventional approach that uses an AEC with a linear filter (line 314) and an ideal response (line 312). As illustrated in FIG. 3B, the non-linear echo cancellation mechanism according to the techniques described herein (line 316) is able to model the acoustic coupling much better than the conventional approach (line 314) while achieving results that are comparable to the ideal echo cancellation for the simulated system (line 312).

The simulation results in FIGS. 3A and 3B illustrate that the techniques for non-linear echo cancellation described herein have almost the same convergence characteristics as a conventional AEC using a linear filter, but provide for 10 dB extra echo cancellation over the conventional approach and have non-linear echo cancellation performance that is substantially equivalent to an AEC with a non-linear Volterra filter for a "known" non-linearity.

The techniques for non-linear echo cancellation described herein are applicable to systems that use multiple microphones. In various embodiments, the described techniques provide for estimating a non-linear reference signal by using spatial filtering of a multi-channel microphone signal to generate a spatially-filtered signal, which is provided to an AEC with a linear adaptive filter for echo cancellation. The techniques described herein provide several benefits over conventional approaches that use non-linear or pre-processing filters. For example, solutions in accordance with the techniques described herein provide for low complexity, which reduces the computational costs of echo cancellation and makes such solutions practical for devices with limited computational power such as SoCs and IoT devices. In addition, solutions in accordance with the techniques described herein are more robust as they are able to track changes in non-linearities over time and improve linear adaptive filter estimates by reducing bias to statistics due to non-linearity.

In various embodiments, the techniques for non-linear echo cancellation described herein can be applied to smart-speakers and IoT edge devices and can be implemented in firmware and/or hardware depending on availability of local device resources. A smartspeaker is a multi-media device with built-in loudspeaker and microphone that enables human-to-machine interaction via voice commands. An IoT edge device is the entry point into IoT cloud-based services. For example, in smartspeaker embodiments with multiple microphones, the techniques described herein may provide significant saving in computational cycles, while also providing "good enough" performance not only after a BF direction change but also fast convergence for all other types of echo path change while maintaining noise robustness. In IoT edge device embodiments, the techniques described herein may enhance the speech signal received by the IoT edge device for a back-end system that may be running automatic speech recognition.

Figure 4:
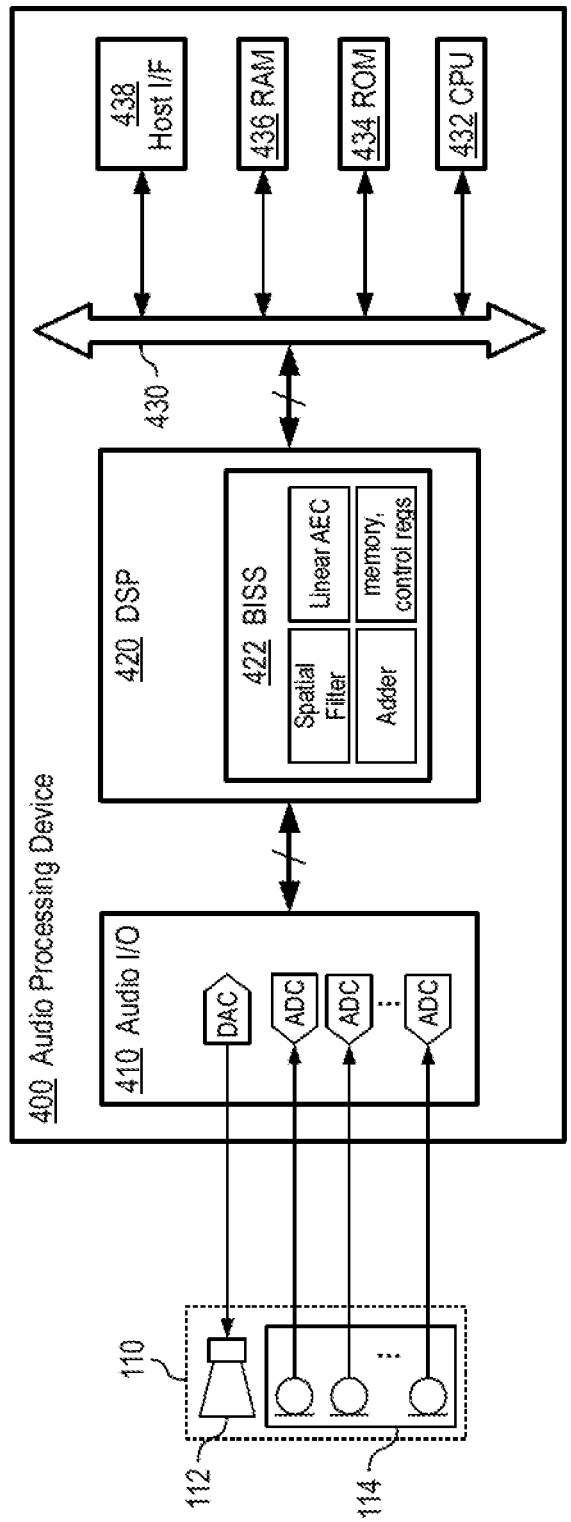
FIG. 4 illustrates a schematic diagram of an example audio processing device, in accordance with some embodiments.

The techniques for non-linear acoustic echo cancellation described herein may be implemented on various types of audio processing devices. FIG. 4 illustrates an example audio processing device that is configured in accordance with the techniques described herein. In the embodiment illustrated in FIG. 4, audio processing device 400 may be a single-chip IC device manufactured on a semiconductor die or a single-chip IC that is manufactured as a SoC. In other embodiments, audio processing device 400 may be a multi-chip module encapsulated in a single semiconductor package or multiple semiconductor packages disposed or mounted on a common substrate, such as a PCB. Thus, audio processing device 400 in FIG. 4 is to be regarded in an illustrative rather than a restrictive sense.

Among other components, processing device 400 includes audio I/O logic 410, DSP 420, CPU 432, read-only memory (ROM) 434, random access memory (RAM) 436, and host interface 438. DSP 420, CPU 432, ROM 434, RAM 436, and host interface 438 are coupled to one or more buses 430. DSP 420 is also coupled to audio I/O logic 410 over a multi-channel bus. Audio I/O logic 410 is coupled to loudspeaker-microphone assembly 110.

Loudspeaker-microphone assembly 110 includes one or more loudspeakers 112 and a microphone array 114. Microphone array 114 includes multiple microphones that are disposed to detect acoustic waves from wanted sound sources (e.g., human speech), but can also detect/record acoustic waves from unwanted sound sources (e.g., such as echo from loudspeaker(s) 112). Loudspeaker(s) 112 are coupled to digital-to-analog converter (DAC) circuitry in audio I/O logic 410. Loudspeaker(s) 112 are configured to receive an analog audio signal from the DAC circuitry, and to emit the audio signal as an acoustic wave. Microphone array 114 is coupled to analog-to-digital converter (ADC) circuitry in audio I/O logic 410. Microphone array 114 is configured to receive acoustic waves from various sound sources and to convert them into analog audio signals that are sent to the ADC circuitry. In some embodiments, some or all of the microphones in microphone array 114 may share the same communication channel to the ADC circuitry in audio I/O logic 410 through suitable multiplexers and buffers. In other embodiments, each microphone in microphone array 114 may have a separate communication channel to, and a separate instance of, the ADC circuitry in audio I/O logic 410. In some embodiments (e.g., smartphones), loudspeaker(s) 112 and microphone array 114 may be integrally formed as the same assembly 110. In some embodiments, (e.g., teleconferencing devices), loudspeaker(s) 112 and microphone array 114 may be separate components that are disposed on a common substrate (e.g., a PCB) mounted within, or on, a housing of assembly 110. In yet other embodiments, assembly 110 may not have a housing but may be formed by virtue of the acoustic proximity of loudspeaker(s) 112 to microphone array 114.

Audio I/O logic 410 includes various logic blocks and circuitry configured to process signals that are transferred between DSP 420 and loudspeaker-microphone assembly 110. For example, audio I/O logic 410 includes DAC circuitry and ADC circuitry. The DAC circuitry includes DACs, amplifiers, and other circuits suitable for signal processing (e.g., circuits for input-matching, amplitude limiting, compression, gain control, parametric or adaptive equalizing, phase shifting, etc.) configured to receive a modulated digital signal from DSP 420 and convert it to an analog audio signal for loudspeaker(s) 112. The ADC circuitry includes ADCs, amplifiers, and other circuits suitable for signal processing (e.g., circuits for input-matching, amplitude limiting, compression, gain control, parametric or adaptive equalizing, phase shifting, etc.) configured to receive analog audio signals from the microphones in microphone array 114 and to convert them to modulated digital signals that are sent to DSP 420.

DSP 420 includes various logic blocks and circuitry configured to process digital signals that are transferred between audio I/O logic 410 and various components coupled to bus(es) 430. For example, DSP 420 includes circuitry configured to receive digital audio data (e.g., a series of bytes) from other components in processing device 400 and to convert the received audio data into modulated digital signals (e.g., a stream of bits) that are send to audio I/O logic 410. DSP 420 also includes circuitry configured to receive modulated digital signals from audio I/O logic 410 and to convert the received signals into digital audio data. In the embodiment illustrated in FIG. 4, DSP 420 includes a Barge-In Sub-System (BISS) logic 422. BISS logic 422 includes a spatial filtering logic block (with a spatial filter $f_{SF}$), an AEC logic block with a linear adaptive filter, and an adder logic block configured in accordance with the non-linear echo cancellation techniques described herein. The spatial filtering logic block may implement, or may be implemented as part of, a BF logic block. BISS logic 422 also includes control registers configured to control operation of the spatial filtering, AEC and adder logic blocks, as well as shared memory (e.g., RAM) to share signal data within its logic blocks and with other blocks of DSP 420 and/or with various components in processing device 400. BISS logic 422 may also include a programmable state machine (PSM). The PSM may be implemented as a microcoded engine that includes its own a microcontroller, which can fetch instructions from microcode memory and use the shared memory to obtain operands for its instructions. The PSM is configured to exercise fine-grained control over the hardware circuitry by programming internal hardware registers (IHR) that are co-located with the hardware functions they control.

Bus(es) 430 may include one or more buses such as a system interconnect and a peripheral interconnect. The system interconnect may be a single-level or multi-level Advanced High-Performance Bus (AHB) that is configured as an interface that couples CPU 432 to the other components of processing device 400, as well as a data and control interface between the various components and the peripheral interconnect. The peripheral interconnect may be an Advanced eXtensible Interface (AXI) bus that provides the primary data and control interface between CPU 432 and its peripherals and other resources (e.g., system resources, I/O blocks, direct memory access (DMA) controllers, etc.), which may be programmed to transfer data between peripheral blocks without burdening the CPU.

CPU 432 includes one or more processing cores configured to execute instructions that may be stored in ROM 434, RAM 436, or flash memory (not shown). ROM 434 is read-only memory (or other suitable non-volatile storage medium) that is configured for storing boot-up routines, configuration parameters, and other firmware parameters and settings. RAM 436 is volatile memory that is configured for storing data and firmware instructions accessed by CPU 432. A flash memory, if present, may be embedded or external non-volatile memory (e.g., NAND flash, NOR flash, etc.) that is configured for storing data, programs, and/or other firmware instructions.

Host interface 438 may include control registers, data registers, and other circuitry configured to transfer data between DSP 420 and a host (not shown). The host may be a microcontroller subsystem disposed on-chip, an off-chip IC device (such as a SoC), and/or an external computer system. The host may include its own CPU that is operable to execute host applications or other firmware/software configured (among other functions) to send, receive, and/or process audio data. In some embodiments, multiple communication circuitry and/or hosts may be instantiated on the same processing device 400 to provide communications over various protocols (e.g., such as Bluetooth and/or wi-fi) for audio and/or other signals that are sent, received, or otherwise processed by device 400. In some embodiments (e.g., such as a smartphone), an application processor (AP) may be instantiated as an on-chip host coupled to interface 438 to provide for execution of various applications and software programs.

In operation, DSP 420 receives audio data (e.g., a series of bytes) over bus(es) 430 (e.g., from host interface 438). DSP 420 converts the received audio data into a modulated digital signal (e.g., a stream of bits) that is sent to BISS logic 422 as a reference signal x(n). The modulated digital signal is also sent to audio I/O logic 410. Audio I/O logic 410 converts the received digital signal into an analog audio signal that is sent to loudspeaker(s) 112. The microphones in microphone array 114 pick up acoustic waves from near-end speech as well as linear and non-linear echo (if any) from loudspeaker(s) 112. The microphones in microphone array 114 convert the received acoustic waves into corresponding analog audio signals that are sent to audio I/O logic 410. Audio I/O logic 410 converts the received analog audio signals into a multi-channel microphone digital signal y(n) that is sent to BISS logic 422 in DSP 420.

In some embodiments, audio processing device 400 may be configured with a single AEC logic (e.g., in system 100A in FIG. 1A) to perform the method for non-linear echo cancellation that is illustrated in FIG. 2A. In some embodiments, audio processing device 400 may be configured with multiple instances of AEC logic, with one AEC instance applied per microphone signal/channel (e.g., in system 100B in FIG. 1B) to perform the method for non-linear echo cancellation illustrated in FIG. 2B. In some embodiments, audio processing device 400 may be configured with a single AEC logic that is applied to the spatial filter output (e.g., in system 100C in FIG. 1C) to perform the method for non-linear echo cancellation illustrated in FIG. 2C. It is noted that audio processing device 400 can be configured in systems with other components and hardware circuits, and for this reason the description of the audio processing device being implemented in the operational contexts of systems 100A-100C of FIGS. 1A-1C is to be regarded in an illustrative rather than a restrictive sense.

Figure 5:
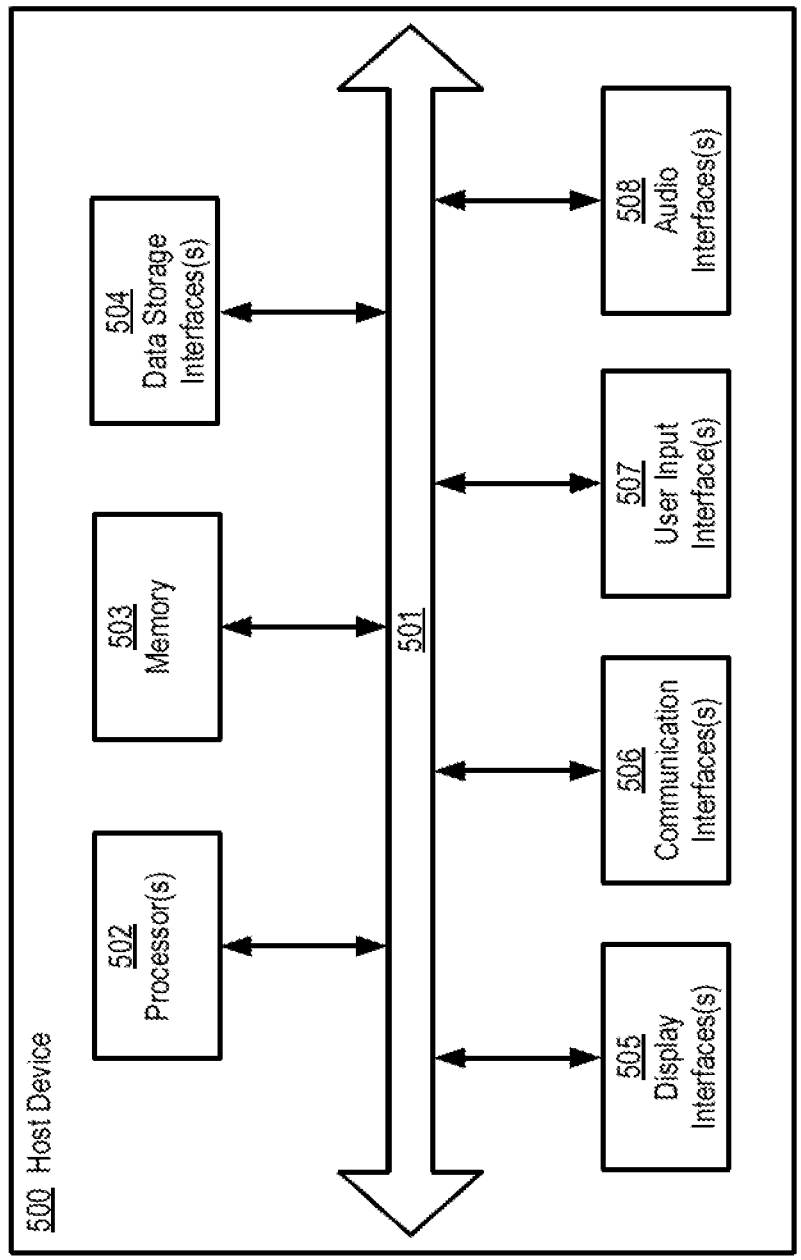
FIG. 5 illustrates a schematic diagram of an example host device, in accordance with some embodiments.

FIG. 5 is a block diagram illustrating host device 500, in accordance with various embodiments. Host device 500 may fully or partially include, and/or operate, the host 140 in FIG. 1 and/or be coupled to the audio processing device 400 of FIG. 4 through host interface 438. The host device 500 illustrated in FIG. 5 may operate as a standalone device or may be connected (e.g., networked) to other machines. In a networked deployment, host device 500 may be implemented as a server blade in could-based physical infrastructure, as a server or a client machine in server-client network, as a peer machine in a P2P (or distributed) network, etc.

Host device 500 may be embodied in various form factors (e.g., an on-chip device, a computer system, etc.) within which sets of instructions may be executed to cause host device 500 to perform one or more of the operations and functionalities described herein. For example, in various embodiments host device 500 may be a SoC device, an IoT device, a server computer, a server blade, a client computer, a personal computer (PC), a tablet, a set-top box (STB), a Personal Digital Assistant (PDA), a smartphone, a web appliance, a speakerphone, a handheld multi-media device, a handheld video player, a handheld gaming device, or any other machine capable of executing a set of instructions (sequential or otherwise) that specify actions to be taken by that machine. When host device 500 is embodied as an on-chip device (e.g., a SoC, an IoT device, etc.), its illustrated components may reside on a common carrier substrate such as, for example, an IC die substrate, a multi-chip module substrate, or the like. When host device 500 is embodied as a computer system (e.g., a server blade, a server computer, a PC, etc.), its illustrated components may be separate integrated circuits and/or discrete components that are disposed on one or more PCB substrates. Further, while only a single host device 500 is illustrated in FIG. 5, in various operational contexts the term "device" may also be commonly understood to include any collection of machines that individually or jointly execute a set (or multiple sets) of instructions to perform any one or more of the operations and functionalities described herein.

Host device 500 includes processor(s) 502, memory 503, data storage interface(s) 504, display interface(s) 505, communication interface(s) 506, user input interface(s) 507, and audio interface(s) 508 that are coupled to one or more busses 501. When host device 500 is embodied as an on-chip device, bus(es) 501 may include one or more on-chip buses such as a system interconnect (e.g., a single-level or multi-level AHB) and a peripheral interconnect (e.g., an AXI bus). When host device 500 is embodied as a computer system, bus(es) 501 may include one or more computer buses such as chipset north/south bridges (that mediate communications between processor(s) 502 and the other components) and various peripheral buses (e.g., PCI, Serial ATA, etc., that mediate communications to various computer peripherals).

Host device 500 includes processor(s) 502. When host device 500 is embodied as an on-chip device, processors(s) 502 may include an ARM processor, a RISC processor, a microprocessor, an application processor, a controller, special-purpose processor, a DSP, an ASIC, an FPGA, or the like. When host device 500 is embodied as a computer system, processor(s) 502 may include one or more CPUs.

Host device 500 also includes memory 503. Memory 503 may include non-volatile memory (e.g., ROM) for storing static data and instructions for processor(s) 502, volatile memory (e.g., RAM) for storing data and executable instructions for processor(s) 502, and/or flash memory for storing firmware (e.g., control algorithms) executable by processor(s) 502 to implement at least a portion of operations and functionalities described herein. Portions of memory 503 may also be dynamically allocated to provide caching, buffering, and/or other memory-based functionalities. Memory 503 may also include removable memory devices that may store one or more sets of software instructions. Such software instructions may also be transmitted or received over a network via the communication interface(s) 506. Software instructions may also reside, completely or at least partially, on a non-transitory computer-readable storage medium and/or within the processor(s) 502 during execution thereof by host device 500.

Host device 500 also includes data storage interface(s) 504. Data storage interface(s) 504 are configured to connect host device 500 to storage devices that are configured for persistently storing data and information that is used by host device 500. Such data storage devices may include persistent storage media of various media types including, but not limited to, electromagnetic disks (e.g., hard disks), optical storage disks (e.g., CD-ROMs), magneto-optical storage disks, solid-state drives, Universal Serial Bus (USB) flash drives, and the like.

Host device 500 also includes display interface(s) 505 and communication interface(s) 506. Display interface(s) 505 are configured to connect host device 500 to display devices (e.g., a liquid crystal display (LCD), touchscreens, computer monitors, TV screens, etc.), and to provide software and hardware support for display interface protocols. Communication interface(s) 506 are configured to transmit and receive data to and from other computing systems/devices. For example, communication interface(s) 506 may include a USB controller and bus for communicating with USB peripheral devices, a network interface card (NIC) for communicating over wired communication networks, and/or wireless network card that can implement a variety of wireless data-transmission protocols such as IEEE 802.11 (wi-fi) and Bluetooth.

Host device 500 also includes user input interface(s) 507 and audio interface(s) 508. User input interface(s) 507 are configured to connect host device 500 to various input devices such as alphanumeric input devices (e.g., a touch-sensitive or typewriter-style keyboard), a pointing device that provides spatial input data (e.g., a computer mouse), and/or any other suitable human interface devices (HIDs) that can communicate user commands and other user-generated information to processor(s) 502. Audio interface(s) 508 are configured to connect host device 500 to various audio devices (e.g., microphones, speakers, etc.) and to provide software and hardware support for various audio input/output.

Various embodiments of the techniques for non-linear acoustic echo cancellation described herein may include various operations. These operations may be performed and/or controlled by hardware components, digital hardware and/or firmware, and/or combinations thereof. As used herein, the term "coupled to" may mean connected directly or connected indirectly through one or more intervening components. Any of the signals provided over various on-chip buses may be time multiplexed with other signals and provided over one or more common on-die buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium, e.g., such as volatile memory and/or non-volatile memory. These instructions may be used to program and/or configure one or more devices that include processors (e.g., CPUs) or equivalents thereof (e.g., such as processing cores, processing engines, microcontrollers, and the like), so that when executed by the processor(s) or the equivalents thereof, the instructions cause the device(s) to perform the described operations for non-linear echo cancellation. A computer-readable medium may also include one or more mechanisms for storing or transmitting information in a form (e.g., software, processing application, etc.) that is readable by a machine (e.g., such as a device or a computer). The non-transitory computer-readable storage medium may include, but is not limited to, electromagnetic storage medium (e.g., floppy disks, hard disks, and the like), optical storage medium (e.g., CD-ROM), magneto-optical storage medium, read-only memory (ROM), random-access memory (RAM), erasable programmable memory (e.g., EPROM and EEPROM), flash memory, or another now-known or later-developed non-transitory type of medium that is suitable for storing information.

Although the operations of the circuit(s) and block(s) herein are shown and described in a particular order, in some embodiments the order of the operations of each circuit/block may be altered so that certain operations may be performed in an inverse order or so that certain operation may be performed, at least in part, concurrently and/or in parallel with other operations. In other embodiments, instructions or sub-operations of distinct operations may be performed in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A system comprising:
a loudspeaker configured to receive a reference signal;
a microphone array configured to provide a multi-channel microphone signal that includes both linear echo and non-linear echo;
a spatial filtering logic configured to receive the reference signal and the multi-channel microphone signal and to generate a spatially-filtered signal, wherein the spatially-filtered signal carries both the linear echo and the non-linear echo of the multi-channel microphone signal;
an acoustic echo canceller (AEC) logic configured at least to:
receive the spatially-filtered signal; and
apply a linear adaptive filter using the spatially-filtered signal to generate a cancellation signal that estimates both the linear echo and the non-linear echo of the multi-channel microphone signal; and
a logic block configured to receive the cancellation signal and to generate an output signal based at least on the cancellation signal.

2. The system of claim 1, wherein the system further comprises a beamformer (BF) logic that includes the spatial filtering logic.

3. The system of claim 1, wherein the AEC logic is configured to periodically compute filter coefficients for the linear adaptive filter based on the output signal.

4. The system of claim 1, wherein the logic block is configured to generate the output signal based on the cancellation signal and on a microphone signal from one channel of the multi-channel microphone signal.

5. The system of claim 1, further comprising multiple instances of the AEC logic and at least two instances of the spatial filtering logic.

6. The system of claim 5, wherein:
the multiple instances of the AEC logic are configured to generate the cancellation signal as a multi-channel echo estimate signal; and
the logic block is further configured to:
generate a multi-channel output signal based on the multi-channel echo estimate signal and the multi-channel microphone signal; and
apply one instance of the spatial filtering logic using the multi-channel output signal to generate the output signal.

7. The system of claim 1, wherein:
the spatial filtering logic is further configured to generate a spatially-filtered microphone signal based on the multi-channel microphone signal; and
the logic block is configured to generate the output signal based on the cancellation signal and the spatially-filtered microphone signal.

8. The system of claim 1, further comprising a host configured to receive the output signal from the logic block and to perform speech recognition.

9. The system of claim 8, wherein the host is configured to:
generate the reference signal; and
provide the reference signal to the loudspeaker and the spatial filtering logic.

10. The system of claim 8, wherein the spatial filtering logic, the AEC logic, and the logic block are disposed on a semiconductor device that is coupled to the host over a network.

11. The system of claim 1, wherein the system is one of a speakerphone, a smartspeaker, and a smartphone.

12. A semiconductor device for audio processing, the semiconductor device comprising a digital signal processor (DSP) that is configured to:
receive a reference signal that is sent to a loudspeaker;
receive a multi-channel microphone signal from a microphone array, wherein the multi-channel microphone signal includes both linear echo and non-linear echo;
apply a spatial filter using the reference signal and the multi-channel microphone signal to generate a spatially-filtered signal, wherein the spatially-filtered signal carries both the linear echo and the non-linear echo of the multi-channel microphone signal;
apply a linear adaptive filter using the spatially-filtered signal to generate a cancellation signal that estimates both the linear echo and the non-linear echo of the multi-channel microphone signal; and
generate an output signal based at least on the cancellation signal.

13. The semiconductor device of claim 12, wherein the DSP is configured to generate the output signal based on the cancellation signal and on a microphone signal from one channel of the multi-channel microphone signal.

14. The semiconductor device of claim 12, wherein the DSP comprises multiple instances of acoustic echo canceller (AEC) logic with linear adaptive filters, and wherein:
the multiple instances of the AEC logic are configured to generate the cancellation signal as a multi-channel echo estimate signal; and
the DSP is further configured to:
generate a multi-channel output signal based on the multi-channel echo estimate signal and the multi-channel microphone signal; and
apply the spatial filter using the multi-channel output signal to generate the output signal.

15. The semiconductor device of claim 12, wherein the DSP is further configured to:
apply the spatial filter using the multi-channel microphone signal to generate a spatially-filtered microphone signal; and
generate the output signal based on the cancellation signal and the spatially-filtered microphone signal.

16. The semiconductor device of claim 12, wherein the DSP comprises a beamformer (BF) logic that includes the spatial filter, an acoustic echo canceller (AEC) logic that includes the linear adaptive filter, and a logic block that includes adder logic configured to generate the output signal.

17. A method for acoustic echo cancellation, the method comprising:
receiving a reference signal that is sent to a loudspeaker;
receiving a multi-channel microphone signal from a microphone array in acoustic proximity to the loudspeaker, wherein the multi-channel microphone signal includes both linear echo and non-linear echo;
generating, by a processing device, a spatially-filtered signal by applying a spatial filter using the reference signal and the multi-channel microphone signal, wherein the spatially-filtered signal carries both the linear echo and the non-linear echo of the multi-channel microphone signal;

generating, by the processing device, a cancellation signal by applying a linear adaptive filter using the spatially-filtered signal, wherein the cancellation signal estimates both the linear echo and the non-linear echo of the multi-channel microphone signal; and generating, by the processing device, an output signal based at least on the cancellation signal.

18. The method of claim 17, wherein generating the output signal comprises using the cancellation signal and a microphone signal from one channel of the multi-channel microphone signal.

19. The method of claim 17, wherein:

generating the cancellation signal comprises using multiple linear adaptive filters to generate the cancellation signal as a multi-channel echo estimate signal; and generating the output signal further comprises:
  generating a multi-channel output signal based on the multi-channel echo estimate signal and the multi-channel microphone signal; and
  applying the spatial filter using the multi-channel output signal to generate the output signal.

20. The method of claim 19, wherein:

generating the cancellation signal comprises applying the spatial filter using the multi-channel microphone signal to generate a spatially-filtered microphone signal; and generating the output signal further comprises generating the output signal based on the cancellation signal and the spatially-filtered microphone signal.

* * * * *